United States Patent [19]

Molvig et al.

[11] Patent Number: 5,377,129
[45] Date of Patent: Dec. 27, 1994

[54] PARTICLE INTERACTION PROCESSING SYSTEM

[75] Inventors: Kim Molvig, Reading; Gregory M. Papadopoulos, Burlington, both of Mass.

[73] Assignee: Massachusetts Institute of Technology, Cambridge, Mass.

[21] Appl. No.: 30,573

[22] Filed: Mar. 12, 1993

Related U.S. Application Data

[63] Continuation-in-part of Ser. No. 812,881, Dec. 20, 1991, abandoned, which is a continuation of Ser. No. 555,754, Jul. 12, 1990, abandoned.

[51] Int. Cl.[5] ............................................. G06F 15/60
[52] U.S. Cl. ................................... 364/378; 364/509; 364/DIG. 1; 364/232.21; 364/224.7; 364/223; 364/DIG. 2; 364/924; 364/924.4; 364/931; 364/931.01; 340/825.79
[58] Field of Search .............. 364/578, DIG. 1, 221.2, 364/232.3, 232.21, 231.9, 224.7, 224.8, 224.8, 224.9, 223, 224.4, DIG. 2, 916.3, 924, 924.4, 931, 931.01, 931.03, 931.01, 509, 510, 524, 527, 801, 803, 806; 340/825, 825.79

[56] References Cited

U.S. PATENT DOCUMENTS

| | | | |
|---|---|---|---|
| T. 987,004 | 10/1979 | Feuer et al. | 364/DIG. 1 |
| 4,449,201 | 5/1984 | Clark | 364/900 |
| 4,498,134 | 2/1985 | Hansen et al. | 364/200 |
| 4,507,726 | 3/1985 | Grinberg et al. | 364/200 |
| 4,524,428 | 6/1985 | Grinberg et al. | 364/900 |
| 4,593,407 | 6/1986 | Kinoishi et al. | 364/DIG. 2 |
| 4,601,055 | 7/1986 | Kent | 382/49 |
| 4,707,859 | 11/1987 | Nudd et al. | 382/28 |
| 4,769,644 | 9/1988 | Frazier | 340/825 |
| 4,805,091 | 2/1989 | Thiel et al. | 364/200 |
| 4,827,432 | 5/1989 | Kasano | 364/518 |
| 4,831,519 | 5/1989 | Morton | 364/200 |
| 4,860,245 | 8/1989 | Kinoshita | 364/DIG. 1 |
| 4,933,895 | 6/1990 | Grinberg et al. | 364/748 |
| 5,159,690 | 10/1992 | Margolus | 364/DIG. 1 |

FOREIGN PATENT DOCUMENTS

0228915 7/1987 European Pat. Off. .

OTHER PUBLICATIONS

Drobot; "Computer Applications in Plasma Science-II" (1989).
Margolus et al.; "Cellular-Automata Supercomputers for Fluid-Dynamic Modeling"; Physical Review Letters vol. 56, No. 16, Apr. 1986.
B. Hasslacher et al., "Discrete Fluids," Special Issue, Los Alamos Science, 1987, pp. 175–217.
C. S. Lin et al., "Plasma Simulation Using The Massively Parallel Processor," NASA CP-2478, Jul. 1987, pp. 185–191.
A. Perez et al., "Ouppi-1, SIMD Computer Using Integrated parallel Processors," Proceedings of Conpar Conference Papers, Plenary Sessions and Stream A Manchester, Sep. 12–16, 1988, British Computer Society parallel Processing Specialist Group GB, pp. 175–185.

(List continued on next page.)

Primary Examiner—Ellis B. Ramirez
Attorney, Agent, or Firm—Fish & Richardson

[57] ABSTRACT

Fluid flow is simulated by a massively parallel data processor having combinational logic for processing collision rules at lattice sites. Following collision processing, particle representations are moved to different sites dependent on direction and velocity of the particles. The collision rules are based on collisions of particles positioned at sites of a three-dimensional lattice. Particle representations identify particles of plural energy levels, and the collision rules allow for transfer of energy between particles. Particle representations relate to particles which move along four-dimensional face-centered hypercube lattices which project to the three-dimensional lattice. The lattice may include interfacing grids of different unit dimensions depending on the resolution required in individual volumes of space.

55 Claims, 16 Drawing Sheets

OTHER PUBLICATIONS

Frisch, Uriel et al., "Lattice Gas Hydrodynamics in Two and Three Dimensions," *Complex Systems*, vol. 1, No. 4, Aug. 1987.

*Proceedings of the Workshop on Discrete Kinetic Theory, Lattice Gas Dynamics and Foundations of Hydrodynamics,* Torino, Italy (Sep. 20-24, 1988) I.S.I.-R. Monaco (Ed), World Scientific.

K. Molvig et al., "Removing the Discreteness Artifacts in 3D Lattice-Gas Fluids," *Proceedings of the Workshop on Discrete Kinetic Theory, Lattice Gas Dynamics and Foundations of Hydrodynamics*, 1989.

K. Molvig et al., "Multi-species Lattice-Gas for Automata Realistic Fluid Dynamics," *Springer Proceedings in Physics*, 46:206-231 (1990).

K. Molvig et al., "Multi-species Lattice Gas Hydrodynamics," *Plasma Fusion Center Report*, PFC/JA-88-23 M.I.T. (1988).

G. Y. Vichniac, "Cellular-Automata Fluids," in *Instabilities and Nonequilibrium Structures II Dynamical Systems and Instabilities*, E. Tirapegui and D. Villarroel, (Eds.) (Kluwer, 1989).

G. Y. Vichniac, "Simulating Physics with Cellular Automata," *Physica*, 10D:96-110 (1984).

U. Frisch, et al., "Lattice-Gas Automata for the Navier-Stokes Equation," *Phys. Rev. Lett.* 56(14):1505-1508 (1986).

U. Frisch et al., "Lattice Gas Hydrodynamics in Two and Three Dimensions," *Complex Systems* 1:649-707 (1987).

L. P. Kadanoff, "On Two Levels," *Physics Today*, 39(9):7 (1986).

N. Margolus et al., "Cellular-Automata Supercomputers for Fluid-Dynamics Modeling," *Phys. Rev. Lett.*, 56:1694-1696 (1986).

J. Hardy et al., "Molecular Dynamics of a Classical Lattice Gas: Transport Properties and Time Correlation Functions," *Phys. Rev.*, A13 (5):1949-1961 (1976).

S. Wofram, "Cellular Automaton Fluids 1: Basic Theory," *J. Stat. Phys.*, 45:471-526 (1986).

M. Hénon, "Isometric Collision Rules for the Four-Dimensional FCHC Lattice Gas," *Complex Systems*, 1:475-494 (1987).

D. d'Humiéres et al., "lattice Gas Models for 3D Hydrodynamics," *Europhys. Lett.*, 2(4):291-297 (1986).

D. d'Humiéres and P. Lallemand, "Numerical Simulations of Hydrodynamics with Lattice Gas Automata in two Dimensions," *Complex Systems.*, 1:599-632 (1987).

D. d'Humiéres et al., "2-D and 3-D Hydrodynamics on Lattice Gases," *Helvetica Physica Acta*, 59:1231-1234 (1986).

B. Chopard and M. Droz, "Cellular Automata Model for Head Conduction in a Fluid," *Phys. Lett.*, A126 (8/9):476-480 (1988).

C. Burges and S. Zaleski, "Buoyant Mixtures of Cellular Automaton Gases," *Complex Systems*, 1:31-50 (1987).

J. P. Rivet, "Three-dimensional Lattice Gas Hydrodynamical Simulations: First Results," *C.R. Acad. Sci. Paris II*, 305:751-756 (1987).

J. Tucker, *High Technology*, (Jun. 1984) pp. 85-87.

N. F. Ramsey, "Thermodynamics and Statistical Mechanics at Negative Absolute Temperatures," *Physical Review*, 103:20-28 (1956).

M. J. Klein, "Negative Absolute Temperatures," *Physical Review*, 104:589 (1956).

E. Fredkin and Tommaso Toffoli, "Conservative Logic," *Int'l J. of Theoretical Physics*, 21(3/4):219-253 (1982).

T. Toffoli, "Cellular Automata as an Alternative to (Rather than an Approximation of) Differential Equations in Modeling Physics," *Physica*, 10D:117-127 (1984).

*Complex Systems*, 1(4):544-851 (Aug. 1987).

FIG. 2a

$$\begin{pmatrix}
(0,\ 0,-1,\ 1) & (0,-1,\ 0,\ 1) & (0,-1,-1,\ 0) & (-1,\ 0,-1,\ 1) & (-1,\ 0,\ 0,\ 0) & (-1,-1,\ 0,\ 0) & (0,\ 0,-1,-1) & (0,-1,\ 0,-1) & (1,-1,\ 0,\ 0) & (1,\ 0,\ 0,-1) & (1,-1,\ 0,\ 0) \\
(0,\ 0,\ 0,\ 1) & (0,-1,\ 0,\ 1) & (0,-1,\ 0,\ 0) & (-1,\ 0,\ 0,\ 1) & (-1,\ 0,\ 0,\ 0) & (-1,-1,\ 0,\ 0) & (0,\ 0,-1,-1) & (0,-1,-1,\ 0) & (-1,\ 0,\ 0,-1) & (-1,-1,\ 0,\ 0) & (-1,-1,\ 0,\ 0)
\end{pmatrix}$$

FIG. 2b

$$\begin{pmatrix}
(-1,-1,-1,\ 1) & (-1,-1,\ 1,-1) & (-1,\ 1,-1,-1) & (-1,-1,-1,-1) & (\ 2,\ 0,\ 0,\ 0) & (-2,\ 0,\ 0,\ 0) & (\ 0,\ 2,\ 0,\ 0) & (\ 0,-2,\ 0,\ 0) & (\ 0,\ 0,\ 2,\ 0) & (\ 0,\ 0,-2,\ 0) & (\ 0,\ 0,\ 0,\ 2) & (\ 0,\ 0,\ 0,-2) \\
(-1,-1,-1,\ 1) & (-1,-1,\ 1,-1) & (-1,\ 1,-1,-1) & (-1,-1,-1,-1) & (-1,-1,-1,-1) & (-1,-1,-1,-1) & (-1,-1,-1,-1) & (-1,-1,-1,-1) & (-1,-1,-1,-1) & (-1,-1,-1,-1) & (-1,-1,-1,-1) & (-1,-1,-1,-1)
\end{pmatrix}$$

$$1\begin{bmatrix}(0,0,-1,1)\\(0,0,-1,-1)\end{bmatrix} \quad 2\begin{bmatrix}(0,1,0,1)\\(0,-1,0,-1)\end{bmatrix} \quad 3\begin{bmatrix}(0,1,-1,0)\\(0,-1,-1,0)\end{bmatrix} \quad 4\begin{bmatrix}(-1,0,0,1)\\(-1,0,0,-1)\end{bmatrix} \quad 5\begin{bmatrix}(1,0,1,0)\\(-1,0,-1,0)\end{bmatrix} \quad 6\begin{bmatrix}(1,1,0,0)\\(-1,-1,0,0)\end{bmatrix}$$

$$7\begin{bmatrix}(0,0,-1,1)\\(0,0,1,-1)\end{bmatrix} \quad 8\begin{bmatrix}(0,-1,0,1)\\(0,1,0,-1)\end{bmatrix} \quad 9\begin{bmatrix}(0,-1,1,0)\\(0,1,-1,0)\end{bmatrix} \quad 10\begin{bmatrix}(-1,0,0,1)\\(1,0,0,-1)\end{bmatrix} \quad 11\begin{bmatrix}(1,0,1,0)\\(-1,0,-1,0)\end{bmatrix} \quad 12\begin{bmatrix}(-1,1,0,0)\\(1,-1,0,0)\end{bmatrix}$$

FIG. 3a $$1\begin{bmatrix}(1,1,1,1)\\(-1,-1,-1,-1)\end{bmatrix} \quad 2\begin{bmatrix}(1,1,1,-1)\\(-1,-1,-1,1)\end{bmatrix} \quad 3\begin{bmatrix}(1,-1,1,1)\\(-1,1,-1,-1)\end{bmatrix} \quad 4\begin{bmatrix}(1,-1,1,1)\\(-1,1,-1,-1)\end{bmatrix} \quad 5\begin{bmatrix}(-1,1,1,1)\\(1,-1,-1,-1)\end{bmatrix} \quad 6\begin{bmatrix}(1,1,-1,-1)\\(-1,-1,1,1)\end{bmatrix}$$

$$7\begin{bmatrix}(1,-1,-1,-1)\\(-1,1,-1,1)\end{bmatrix} \quad 8\begin{bmatrix}(-1,1,1,-1)\\(1,-1,-1,1)\end{bmatrix} \quad 9\begin{bmatrix}(2,0,0,0)\\(-2,0,0,0)\end{bmatrix} \quad 10\begin{bmatrix}(0,2,0,0)\\(0,-2,0,0)\end{bmatrix} \quad 11\begin{bmatrix}(0,0,2,0)\\(0,0,-2,0)\end{bmatrix} \quad 12\begin{bmatrix}(0,0,0,2)\\(0,0,0,-2)\end{bmatrix}$$

FIG. 3b

| EQUIVALENCE CLASS | TYPE & ANGLE | NUMBER | DEGENERACY |
|---|---|---|---|
| 1 | 1+1=0, 180° | 12 X 1 | 12 |
| 2 | 1+1=2, 90° | 12 X 6 | 3 |
| 3 | 1+1=1, 120° | 12 X 8 | 4 |
| 4 | 1+1=3 | 12 X 8 | 1 |

PARTICLE INTERACTION PROCESSING SYSTEM

GOVERNMENT SUPPORT

The United States Government has certain interests in this invention under Contract No. N0014-87-J-1220 with the Department of the Navy.

RELATED APPLICATIONS

This is a continuation-in-part of PCT Application No. PCT/US91/04930, filed Jul. 12, 1991, designating the United States, which is a continuation-in-part of U.S. patent application Ser. No. 07/812,881, filed Dec. 20, 1991 which is a File Wrapper Continuation of Ser. No. 07/555,754, filed Jul. 12, 1990, now abandoned.

BACKGROUND OF THE INVENTION

A fluid is generally defined as any substance that can flow. Fluids encompass gases, liquids and combinations of gases and liquids. The field of fluid dynamics attempts to explain and characterize the behavior of fluids. Conventionally, such characterization has been through differential equations. The use of equations to simulate large and complex physical environments is difficult at least. Further, approximations inherent in processing the equations can cause significant errors.

A fundamental view of fluid dynamics is that fluids are comprised of particles. A corollary of this view is that behavior of the fluids can be explained from the behavior of the particles that make up the fluid. A vast majority of particles in the fluid are constantly in motion. The particles move undisturbed until they collide with other particles. Such a view of particles has given rise to a simulation approach in which the particles are viewed as traveling on a lattice and are processed individually. However, such a discrete system suffers several discreteness artifacts not found in real fluids.

SUMMARY OF THE INVENTION

The present invention relates to a data processing system and method having particular application to the simulation of flow. Principal features of the system include the identification of plural possible energy states for each particle on a lattice and identification of elements on the lattice by state vectors which are processed in combinational logic.

A flow processing system embodying the present invention comprises storage means for storing particle representations of plural particles for each of the plural sites of a lattice. The representations identify, for each particle, one of plural possible energy and momentum states. Collision processing means process, for each lattice site, the particle representations to generate second particle representations according to collision rules. The collision rules include rules which cause a second particle representation which reflects a transfer of energy and momentum between particles. The representations are then processed across the lattice to generate new representations which reflect movement of particles in the lattice to new sites.

Preferably, collision logic provides for greater rates of energy transfer in one direction than in a reverse direction. Specifically, the number of energy transfer collisions and inverse transfer collisions allowed may be regulated to insure that the system exhibits Gallilean invariance without dynamic pressure anomaly over a range of densities and temperatures.

The collisions for many sites may be performed in parallel processors. The collision rules conserve mass, momentum and energy. Preferably, the particle representations define particles of different four-dimensional velocities. The particles may move along four-dimensional face-centered hypercubes projected into three-dimensional space. The processors may provide for movement of particles on a nonuniform grid.

The lattice structure simplifies processing by forcing the particles to reside at discrete locations. The system relies on combinational logic to process simple collision rules, so no floating point arithmetic is required, and the errors inherent in such calculations due to approximation are avoided. By providing plural particle energy levels and collisions which result in energy transfer between particles, the discreteness artifacts which result from the discrete nature of the process can be eliminated.

The particle representations may comprise a state vector for each lattice site. The state vector is a set of bits, each bit or group of bits representing a particle or particles of a particular energy and a particular direction of movement at the site. In the preferred system, a sequencer selects like bits of a plurality of sites of the lattice together and combinational collision logic processes a common collision rule on all selected bits simultaneously. In performing a collision, the combinational logic need only set state bits where the initial particle representation indicates that all colliding particles are present and that there are holes where all resultant collided particles are to be present in the second particle representation. The combinational logic may receive masking inputs to prevent performance of certain collision rules; such masking inputs easily provide for the different rates of energy transfer. Other masking inputs may force a boundary rule and assist in implementation of a nonuniform grid.

To allow for varying levels of resolution throughout a simulated volume, the lattice may comprise interfacing grids of different unit dimensions. Accordingly, the system provides for grid interface processing. Particles of a first grid are coalesced into larger particles of a second grid. Particles of a second grid moving toward the first grid are exploded into smaller particles of the first grid. To maintain conservation of mass and energy, the collision processor processes particle representations of the respective grids at rates which are inversely related to the unit dimensions of the grids. The first and second grids may overlap in a volume in which the particles coalesce and explode. In a system which allows for plural possible particle speeds, the first and second grids overlap by different amounts for particles of different speeds.

The system allows for situations in which the number of particles in the first grid moving toward the second grid is not sufficient to maintain conservation of mass with generation of a particle in the second grid. Particles of the first grid are allowed to coalesce into a particle of the second grid having a larger mass than the total mass of the coalesced particles. Subsequently, however, particles of the first grid are eliminated without coalescing them into particles of the second grid in order to maintain a conservation of mass at the grid interface over time. A count, termed an "antimatter" count, is stored for a block of sites in the first grid to represent the imbalance in the mass and momentum of particles coalesced from the first grid into particles of the second grid.

To avoid any artifacts in momentum, the system may also allow for the creation of what is termed "down antimatter." Particles in the first grid may be created other than by explosion of particles from the second grid, and like particles are subsequently annihilated in the first grid to maintain conservation of mass at the interface over time. Preferably, the particles in the first grid are created and annihilated as a function of the presence of other particles at the interface moving from the first grid toward the second grid.

BRIEF DESCRIPTION OF THE DRAWINGS

FIGS. 2a and 2b list the possible velocity vectors that the particles at any given lattice site may assume.

FIGS. 3a and 3b list the possible particle pairings for the first equivalence class.

DETAILED DESCRIPTION OF PREFERRED EMBODIMENTS

The present invention provides a method and apparatus for solving particle flow problems such as in fluid dynamics by effectively simulating fluid behavior with a special purpose data processing system. Moreover, the particle flow problems are solved using purely binary logic. As such, the system does not suffer from the drawbacks of floating point arithmetic computation (e.g. error attributable to decimal place roundoff).

Figure 1A:
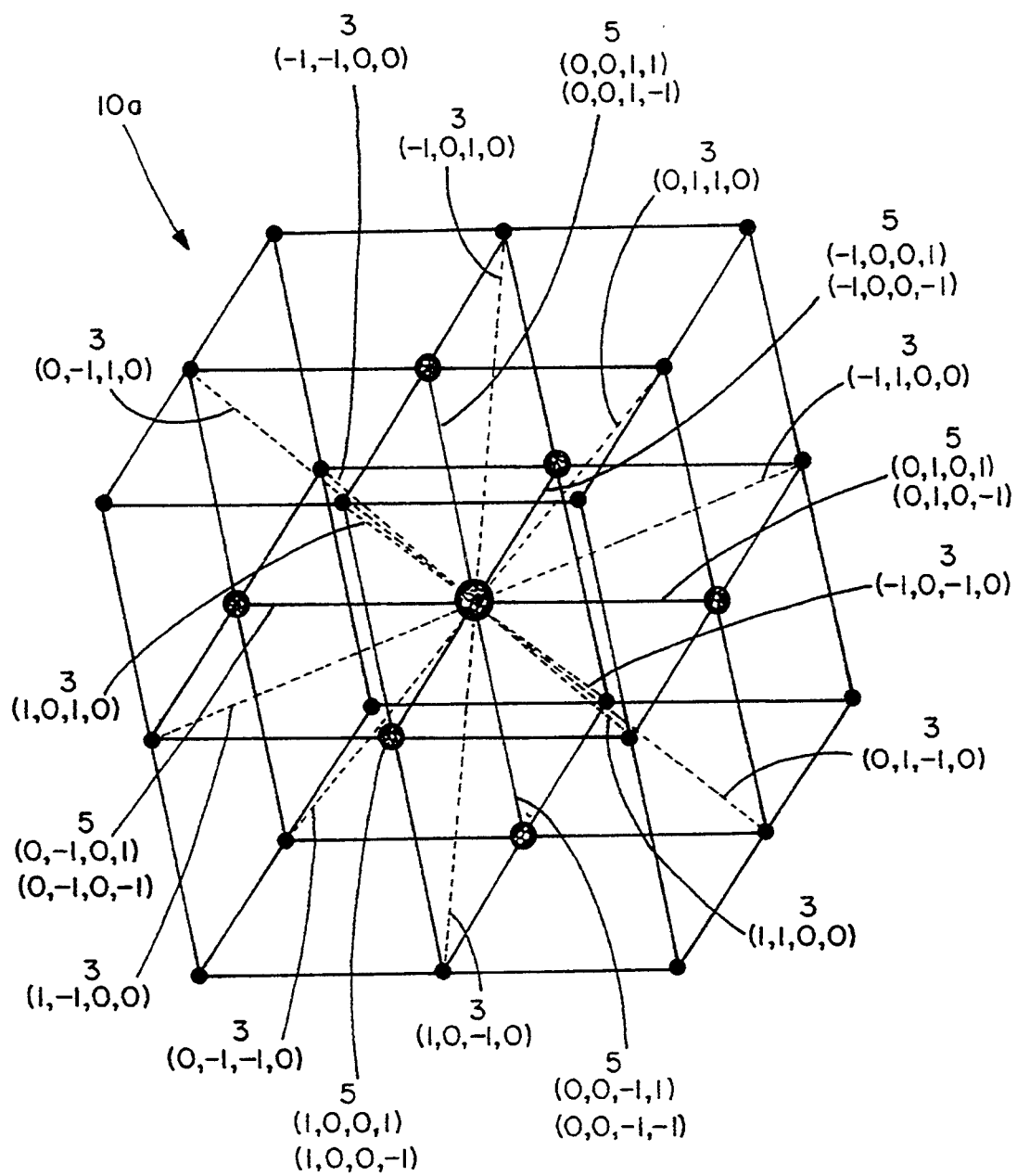
FIG. 1a is a projection of the energy 1 sublattice of the four dimensional face centered hypercubic lattice onto the three dimensional lattice where particles reside.

A volume of fluid consists of a number of particles such as molecules distributed throughout a volume. The particles in the volume move in many different directions, and a number of collisions occur between the particles. The system captures the physical behavior of the volume of fluid within practical computational limits by imposing a three dimensional (3-D) lattice structure onto the volume of fluid. A portion of this three dimensional cubic lattice 10 is shown in FIG. 1a. The lattice structure is of an appropriate size to cover the entire volume of fluid. Particles of the fluid may only reside at lattice sites (i.e. vertices) of the lattice. Movement of the particles, however, is not constrained to be along the edges of the three dimensional lattice; rather particles are only constrained to reside at a lattice site for any discrete time step.

During each time step, particles which reside at a site are allowed to collide. The states of the particles thus change according to predetermined collision rules. Despite the discreteness of the lattice structure, it has been determined that true fluid flow can be simulated without discreteness artifacts by allowing multiple energy levels of the particles, by proper selection of the committed directions of travel of the particles along the lattice structure and by proper selection of collision rules. Proper direction of movement requires that the particles be considered to move in a four-dimensional space. The size and orientation of the lattice structures vary for each energy level. In selecting the lattices, the sum over the directions of the four-fold tensor product of the unit vectors in each energy level must form a purely isotropic rank four tensor. This rank four isotropy property must hold in each energy level separately. All integer energy levels exist and have this property. The displacement/velocity vectors of the integer energy levels 1, 2, 3 and 4 are described below.

Figure 1B:
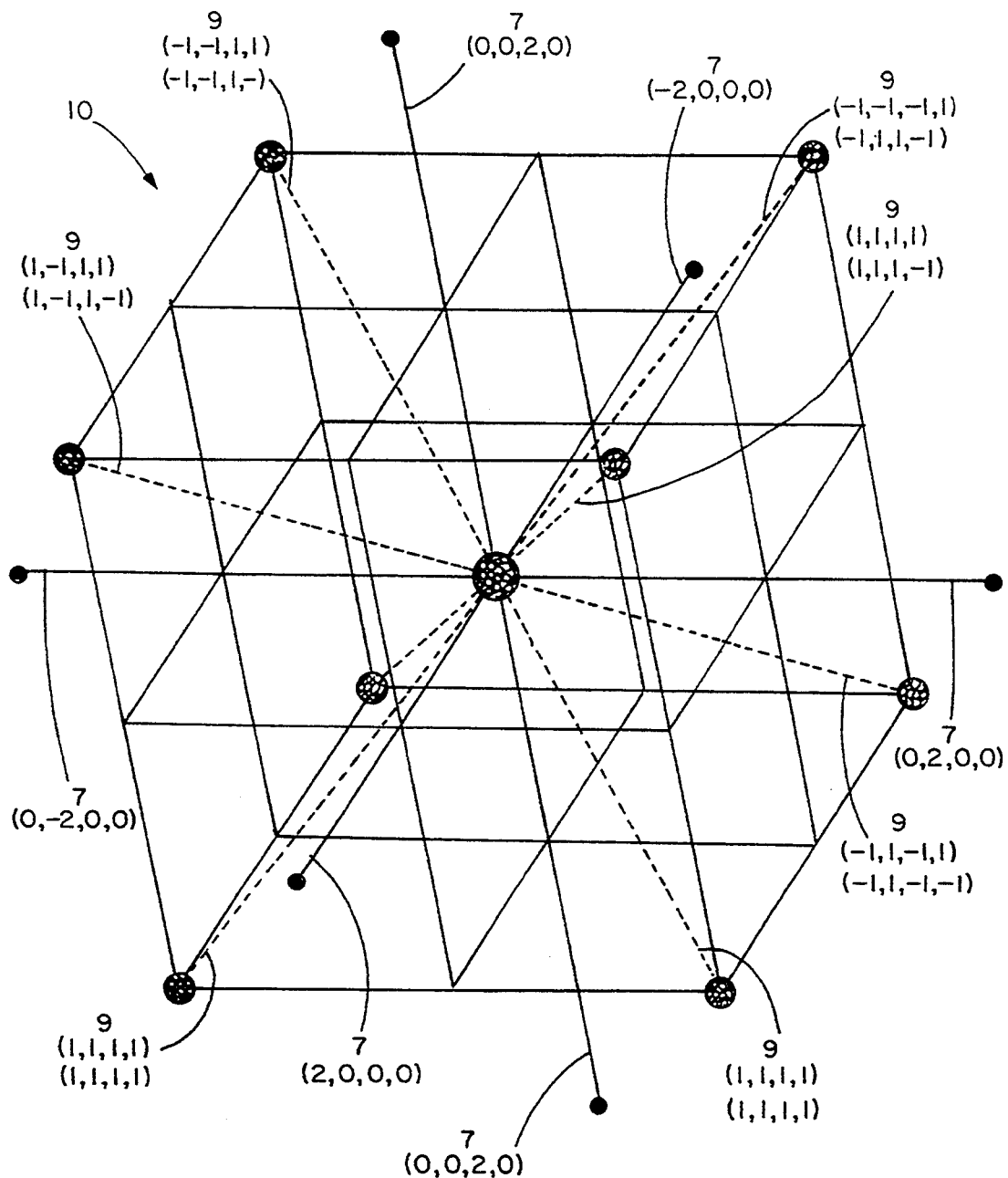
FIG. 1b is a projection of the energy 2 sublattice of the four dimensional face centered hypercubic lattice on to the three dimensional lattice where particles reside.

The energy 1 and 2 particles move in a four-dimensional face-centered hypercubic (FCHC) lattice structure. The movement of each particle projects into the three-dimensional lattice of FIGS. 1a and 1b. FIG. 1a illustrates the projection of particle movement of a first energy level, and FIG. 1b illustrates the projection of movement of particles of a second energy level onto the same three-dimensional lattice.

The FCHC symmetry for a single particle energy is described in B. Hasslacher et al., *Complex Systems* (1987). Hasslacher et al. did not describe a FCHC symmetry for multiple particle energies such as embodied in the present invention. Furthermore, unlike the present invention, they did not propose energy-exchange collisions. These changes will be described in more detail below.

Movement of the particles in the four dimensions can be represented by vectors (x, y, z, w). FIG. 2a illustrates the movement vectors of the first energy level which project into three dimensions as illustrates in FIG. 1a. The movement vectors of the particles of the second energy level are presented in FIG. 2b and project into the three-dimensional lattice as illustrated in FIG. 1b. The vectors presented in FIGS. 2a and 2b represent the displacement of a particle in each of the four dimensions in one time step and are thus the velocity vectors of displacement per time step. The energy 1 vector of FIG. 2a can be seen as permutations of $(\pm 1, \pm 1, 0, 0)$ where the two $+1$ values may be shifted to any of the four dimensions. Similarly, the energy 2 vectors of FIG. 2b can be seen as permutations of $(\pm 1, \pm 1, \pm 1, \pm 1)$ and $(\pm 2, 0, 0, 0)$. Although the implementations presented here utilize only three energy levels, 0, 1 and 2, additional energy levels may be represented in the system. For example, the third energy level would be permutations of $(\pm 2, \pm 1, \pm 1, 0)$, and a fourth level energy would be permutations of $(\pm 2, \pm 2, 0, 0)$.

The energy of each particle is equal to one half the sum of the squares of the units of displacement in each direction. Thus, the energy of the first level is $\frac{1}{2}(1+1)=1$, and that of the second level is $\frac{1}{2}(1+1+1+1)=\frac{1}{2}(4)=2$. Similarly, the integer energy values of the third and fourth levels are 3 and 4. The resultant velocities of the velocity vectors can be computed from the Pythagorean Theorem as the square root of the sum of the squares of the displacements in each direction. Thus, for the energy 1 particles the velocity is $\sqrt{1+1}=\sqrt{2}$, and for energy 2 particles the velocity resultant is $\sqrt{4}=2$.

As can be seen from FIGS. 2a and 2b, there are 24 possible particles in each of energies levels 1 and 2, each particle having a different direction of movement in four dimensions. Energy 3 particles may move in 96 directions and energy 4 particles may move in 24 directions. In the three-speed (subsonic flow) implementations described here, in addition to the 24 directions of energy 1 particles and 24 directions of energy 2 particles, six rest particles are allowed to remove the discreteness artifacts as described below, for a total of 54 possible particle states at each site of the three-dimensional lattice of FIG. 1a. In a five speed transonic flow implementation there are 169 states. As discussed in detail below, with each time step selected pairs of those particles are allowed to collide; pairs of colliding particles at each site generate pairs of collided particles.

With reference to FIG. 1a, for each lattice site, there are 24 directions of travel 3 and 5 that a particle may assume. These directions are labelled nearest neighbor directions because the velocity vectors they represent point to FCHC nodes denoted as nearest neighbors. The nearest neighbor nodes are located $\sqrt{2}$ units away from the lattice site in the four dimensional space. In addition, there are 24 other directions of travel 7 and 9 (in FIG. 1b) that a particle may assume. Such FCHC nodes are denoted as next nearest neighbors. These nodes are located 2 units from the lattice site. A particle resident at a given 3-D lattice site may travel towards an FCHC nearest neighbor, a FCHC next nearest neighbor or remain stationary in a single time step.

The velocity vectors directed towards nearest neighbors that have no components in the fourth dimension (i.e. the last coordinate position is zero) are the vectors 3 in FIG. 1a. These vectors are represented as dotted lines. Also shown in FIG. 1a are the velocity vectors 5 which have components in the fourth dimension. These types of vector are represented by solid lines running from the central node to the surrounding nodes. Each said line represents a vector pair for each node because the component of the vector in the fourth dimension (i.e. a 1 or $-1$ in the last coordinate position) cannot be seen in three dimensions. As such the two velocity vectors project onto three dimensions as the same line.

FIG. 1b provides a similar illustration of the velocity vectors for energy 2 particles. The velocity vectors 7 existing solely in three dimensions are, however, represented by solid lines; whereas, the velocity vectors 9 that have components in the fourth dimension are represented by broken lines running from the central node. In addition, the vectors $(0,0,0,2)$ and $(0,0,0,-2)$ are not shown in FIG. 1b because they have no components in the other three dimensions, and accordingly, they have no projection into the three dimensions.

The eight vectors $(\pm 2, 0, 0, 0)$ of energy 2 particles together form a hyperoctahedron. The 16 velocity vectors $(\pm 1, \pm 1, \pm 1, \pm 1)$ together form a hypercube. The hyperoctahedron and the hypercube formed by the respective velocity vectors in combination form a generic FCHC polytope. As such, the links connecting the next nearest neighbors have a FCHC geometry. In fact, all additional speeds for higher integer energies have the required rank four isotropy, though not necessarily the FCHC lattice structure. Therefore, this approach may be generalized for higher energies in addition to the present three.

The system operates in discrete time steps. For each discrete time step, two phases of activity are performed. In the first phase, any collisions that may and are caused to occur are performed. Once the collisions are performed, the particles are moved in the second phase. A particle will propagate undisturbed with its current speed and direction unless a collision occurs. A collision affects the velocity vectors of the colliding particles.

The collisions may be categorized into two varieties of collisions: adiabatic collisions and energy exchange collisions. Adiabatic collisions are the collisions that do not change the numbers of particles of each energy level and therefore do not change the energy distribution in the system. In the present embodiments, the only adiabatic collisions are self-collisions between particles of the same energy level. Self collisions are of two additional varieties: self collisions between energy 1 particles and self collisions between energy 2 particles. Energy exchange collisions, in contrast, are those collisions in which energy from one particle is transferred to another particle, as where two energy 1 particles collide to form an energy 2 particle and a stationary particle.

For purposes of clarity, both varieties of self collisions are described herein together. To better understand self collisions, it is best to first examine how particles may be paired. To obtain conservation of momentum and energy, it is necessary that the net velocity vector of a pair of collided particles resulting from a collision be equal to the net velocity vector of the colliding pair of particles. There are four classes of equivalence into which the particles of given energy may be paired. Each of these classes is characterized by the magnitude of the net velocity vector resulting from the summing of the velocity vectors of the particles being paired. The first equivalence class is for the pairs whose net velocity vectors have a magnitude of zero. For each energy of particles, there are 12 pairs of particles that when combined have a net velocity vector of zero. Such pairs of energy 1 particles are shown in FIG. 3a and such pairs of energy 2 particles are shown in FIG.

3b. The angle between the velocity vectors that are paired is 180°.

The zero net velocity vector exhibits a property known as degeneracy which implies that the zero velocity vector may be the product of any one of multiple (i.e. twelve) pairs of particles. This property is important for these collisions to conserve energy and momentum.

Figure 4A:
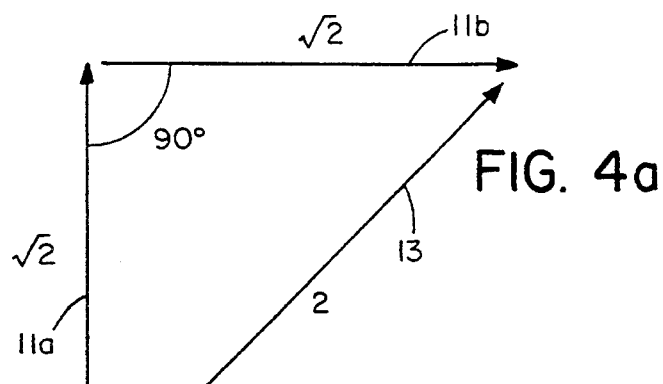
FIGS. 4a and 4b illustrate how the net velocity vectors of the second equivalence class can be found by applying the Pythagorean Theorem.
Figure 4B:
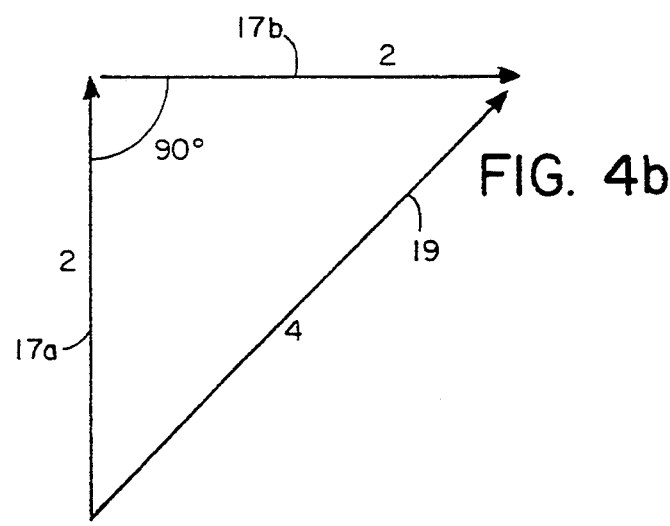

The second equivalence class consists of those pairs of particles that collide at an angle of 90°. For energy 1 particles in this equivalence class having a speed of $\sqrt{2}$, the magnitude of the net velocity vector of the pairs in this equivalence class is 2; for energy 2 particles in this equivalence class having a speed of 2, the net velocity magnitude of the pair is 4. These net velocity vector values may be confirmed by straightforward vector addition. In particular, to add two vectors, the two vectors 11a and 11b are placed head to tail such as shown in FIG. 4a for an energy 1 pair of this equivalence class. The vectors 11a and 11b each have a length of $\sqrt{2}$. Their product is found by drawing a vector 13 from the tail of the first vector 11a to the head of the second vector 11b. Since, these three vectors 11a, 11b and 13 form a right triangle, the speed of vector 13 can be found by applying the Pythagorean Theorem. In particular, the speed (i.e. the length) of vector 13 equals the square root of the sum of the squares of the speeds (length) of the vectors 11a and 11b. Hence, the speed of vector 13 equals 2. Similarly, for energy 2 particles in this equivalence class, the speed of the net velocity vector 19 may be found to be 4 by applying the Pythagorean Theorem to the velocity vectors 17a and 17b which each have a speed of 2.

Figure 5:
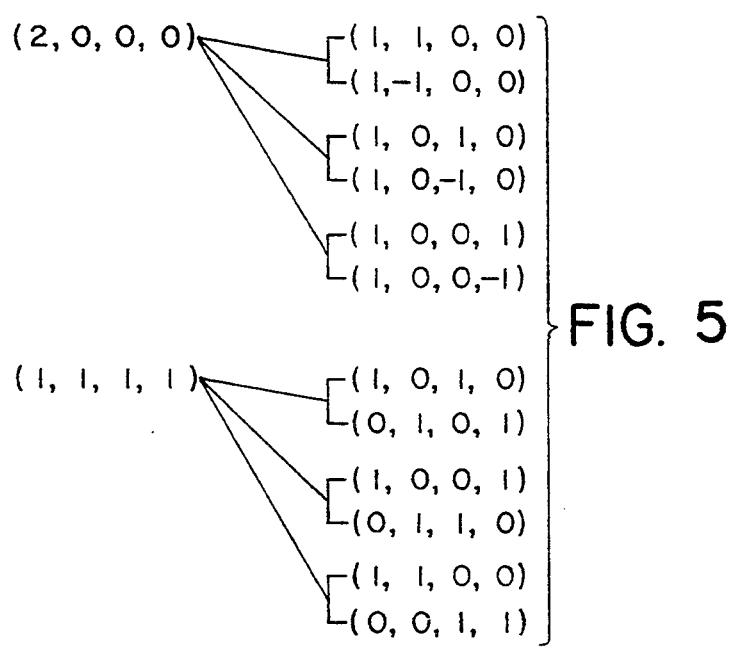
FIG. 5 presents two examples of the degeneracy of the second equivalence class.

Each net velocity vector for this second equivalence class can be produced by 3 pairs of particles. As such, each net velocity vector has a degeneracy of 3. FIG. 5 illustrates an example of the two sets of three pairings that may produce the net velocity vectors of (2,0,0,0) and (1,1,1,1), respectively, for energy 1 particles. Since, for energy 1 particles, there are 24 possible net velocity vectors whose magnitude is 2 (i.e., the net velocity vectors ($\pm 1, \pm 1, \pm 1, \pm 1$), ($\pm 2, 0, 0, 0$), ($0, \pm 2, 0, 0$), ($0, 0, \pm 2, 0$), ($0, 0, 0, \pm 2$)), and there are 3 pairings that can result in each such net velocity vector (i.e., a degeneracy of 3), it follows that there are 24×3 or 72 pairings in the second equivalence class for each speed of particle.

Figures 6, 7:
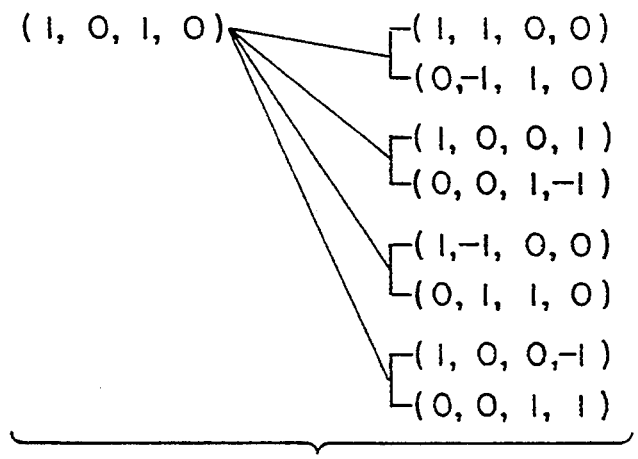
FIG. 6 illustrates a single example of the degeneracy of the third equivalence class.
FIG. 7 is a table summarizing the equivalence classes.

The third equivalence class is made of those pairs of particles which produce a net velocity vector having the same magnitude as each of the velocity vectors of the particles. For each of the 24 possible net velocity vectors, four pairs of particles can produce the net velocity vector. Accordingly, there are 24×4 or 96 particle pairs in the third equivalence class. An example for the net velocity vector (1,0,1,0) is shown in FIG. 6. Particles paired in this equivalence class are separated by a 120° angle.

The fourth and final equivalence class comprises the remaining self collision pairs that do not fit into the first three classes. This class is comprised of 96 pairs of particles. Each net velocity vector has a unique pair of particles that produces it. As such, there is no degeneracy and there can be no collision to generate an equivalent pair of particles. FIG. 7 is a table that summarizes the above discussion of the equivalence classes.

The first three equivalence classes constitute the pairings in which self-collisions are possible for particles on the FCHC. These three classes constitute 180 pairings out of the possible 276 pairings or 15/23 of the possible pairings. During the first phase of operation in one implementation, the system sweeps through all 180 pairings to perform a collision whenever possible. Whether a collision is performed is dictated by whether both particles of the pair are present at the 3-D lattice site or not. It is also dictated by whether the collided pair of particles resulting from the collision are not present. In this embodiment, to conserve particle mass exactly, output particles must not be produced that have the same velocity vector of existing particles. This condition can be relaxed by allowing more than one particle per state per site.

How collisions are performed can now be explained in view of the above discussion of the possible pairings of particles. For illustrative purposes only binary (i.e., two particle) plus spectator collisions will be discussed. Such binary collisions account for the majority of particle collisions that occur in real physical systems. The sequences of binary collisions allowed in the present invention aggregate to produce results equivalent to tertiary and higher order collisions. As such, this limitation to binary collisions is acceptable. Such collisions allow for spectator particles to reside at the lattice site so that the spectator particles do not undergo any change in state. It should nevertheless, be appreciated that the present invention is not limited to binary collisions, for other higher order collisions are equally viable.

Figure 8A:
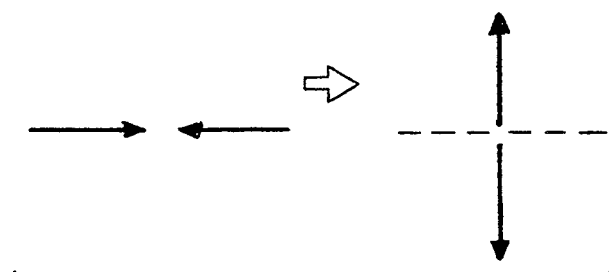
FIGS. 8a, 8b and 8c depict examples of particle collisions for the respective first three equivalence classes.
Figure 8B:
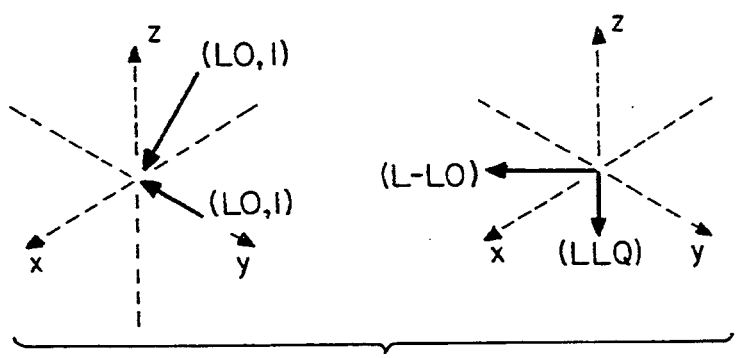
Figure 8C:
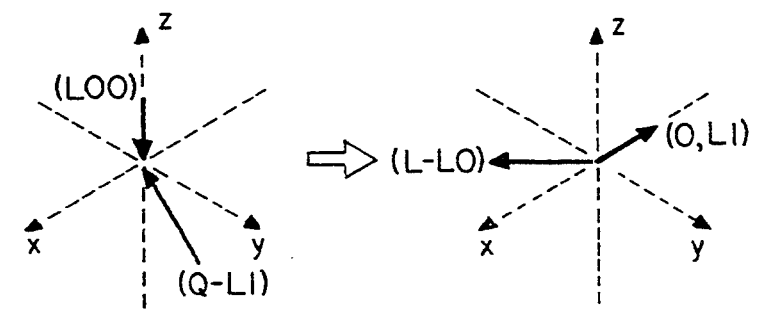

As was mentioned above, collisions can occur for the first three equivalence classes. Examples of such collisions for the respective equivalence classes are shown in FIGS. 8a, 8b and 8c. Each of these types of collisions exhibits conservation of energy, momentum and mass. Mass is conserved because the number of particles entering and leaving all collisions is the same. The conservation of momentum and energy is evident by comparing the velocity vectors of the particle pairs to be collided with the resulting velocity vectors for the particles after the collision. A cursory analysis indicates that the vector sum of the particle pairs prior to collision is equal to the vector sum of the particle pairs after collision. Since this is the only factor influencing momentum and energy that is not constant in the system and since this factor is conserved, it is apparent that the conservation laws hold exactly for the system in the collisions.

In a sequential processor, the collisions are performed by cycling through each of the possible particle pairings for each lattice site in iterative fashion. The system begins with the first equivalence class of particle pairings. The system looks at the first pairing in the first equivalence class to check to see whether both of the particles for the pairing are present or not. The presence of these particles can be summarized as a truth condition. If the truth condition indicates that both particles are present, the system proceeds.

The system knows the net velocity vector for each particle pairing. To ensure conservation of energy and momentum, the particles resulting from the collision must also share the same net velocity vector. For example, since there are three possible pairings that can generate any net velocity vector in the second equivalence class, the system knows that the particle pair resulting from the collision must be one of the other two pairings that can produce the same net velocity vector. Other particle pairings on the lattice cannot produce such a net velocity vector. The system can either randomly select one of these pairings to be the output or cycle through all pairings. Before the system can perform the collision, it must, however, first check a second truth condition. The second truth condition indicates the availability of the selected output particle pair, also known as the hole pair. If both truth conditions hold true (i.e., particles are present and the hole pair is present), the collision is performed.

Once the collision is performed for the first pair or once the system determines that the collision cannot be performed, the system proceeds to the next particle pair as dictated by the index sequencing scheme. Processing of the energy 1 and energy 2 particles occurs in parallel. This processing continues until all particle pairs for the first equivalence class have been examined. Once this is completed for the first equivalence class, the pairings in the second equivalence class are examined, and, similarly, the pairings in the third equivalence class are examined.

The above description makes evident the role of the degeneracy in performing the collisions. In particular, the system selects one of the permutations of particle pairings within a degenerate group for a net velocity vector. Given that the fourth equivalence class does not have any degeneracy, it is impossible to conserve momentum with such collisions in that equivalence class. As such, the collisions are not performed.

Either a random number of collision permutations may be selected for each examination of a particle pair, or all of the possible permutations may be examined. In the latter approach, all possible events that can occur are attempted. As an example, suppose that a particle pair from the first equivalence class is being analyzed to determine whether to perform a collision. There would be eleven other particle pairs that could produce the same net velocity vector that the given particle pair produces. Thus, the system could choose at random any one of the eleven other pairings, if the random number approach was utilized. Under the alternative embodiment, however, each pairing would be selected in consecutive order to enable all possible collisions. By controlling these and all other collision rules, the viscosity of the fluid can be regulated.

Figure 9A:
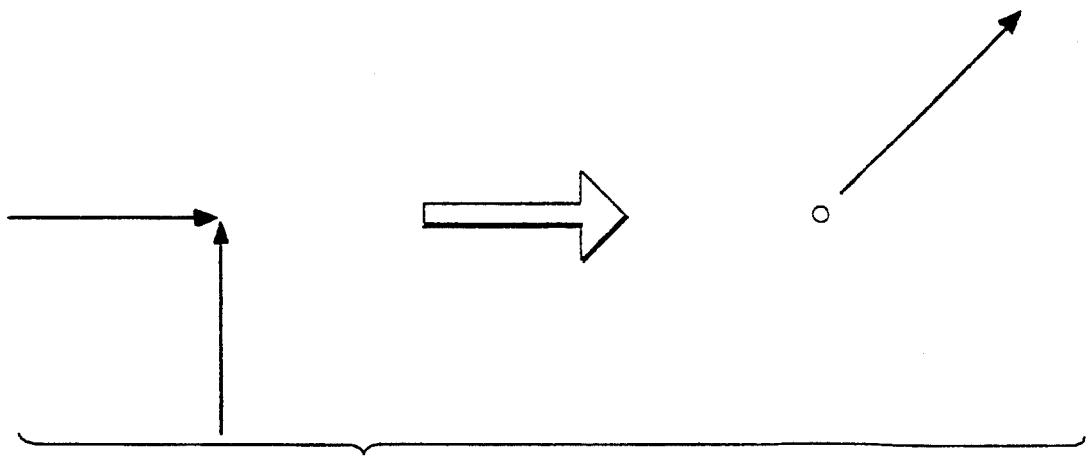
FIGS. 9a and 9b show forward and inverse energy transfer collisions, respectively.
Figure 9B:
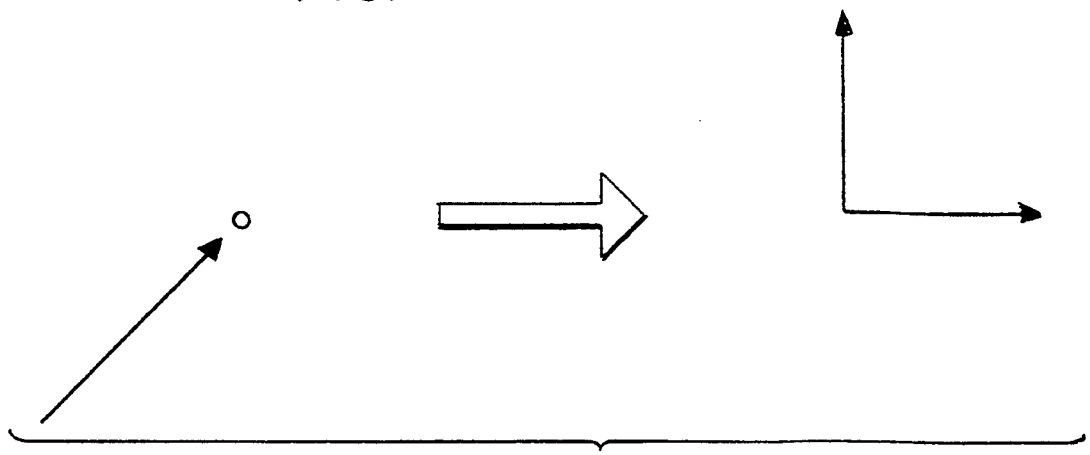

The other variety of collisions that are performed by the present invention are energy exchange collisions. Energy exchange collisions occur when two energy 1 particles collide to form an energy 2 particle and an energy 0 particle. A diagram of this type of collision is shown in FIG. 9a. There are 72 possible pairings that bring about such a collision when the particles are present. In addition, the present invention also enables inverse energy exchange collisions (FIG. 9b), wherein an energy 2 particle strikes a stopped particle to produce two energy 1 particles. These types of collisions are referred to as inverse energy collisions because they perform the exact opposite type of collision that the forward energy exchange collisions perform. The inclusion of energy exchange collisions with variable forward and inverse rates adds an additional degree of freedom to the system. As will be discussed below, the inclusion of this additional degree of freedom is important so that the system duplicates true fluid behavior.

Equivalence class 2 of the energy 1 particles also serves as the basis for energy transfer collisions. As can be seen in FIG. 5c, the net velocity vector of each pair of energy 1 particles is itself a group 2 velocity vector. Thus, the energy 2 velocity vector and a stationary particle together provide the same mass energy and momentum as the pair of energy 1 vectors. Such grouping can therefore define collision rules which transfer energy between particles. The energy of one energy 1 particle can be transferred to another energy 1 particle, resulting in an energy 2 particle and an energy 0 particle. Similarly, an energy 2 particle may strike an energy 0 particle resulting in two energy 1 particles.

The forward energy exchange collisions and the inverse (backward) energy exchange collisions are performed much in the same manner described above for the self collisions. In particular, possible collision groupings are determined to maintain constant net velocity vectors before and after collisions. The system looks at the first truth condition to determine whether the particles are present, and also looks at the second truth condition to determine whether the hole pair is present. If both truth conditions are true, the energy exchange collision (or the inverse energy exchange collision) is performed. As will be discussed below, the forward energy exchange collisions and the inverse energy exchange collisions are limited by a mask that is instituted in the system to affect the rate of such collisions.

Once the collisions have been performed, the particles are moved in the movement phase or operation. The details of how the movement is realized in hardware is given below.

The present invention is able to overcome the major problems suffered by prior art systems. The systems are discrete in that the particles are limited to discrete positions on a lattice. Such particles are not allowed to be continuously positioned throughout a volume as would generally be experienced in a true physical system. Three artifacts resulting from the discreteness are nonisotropy of the stress tensor, non-Gallilean invariance and a dynamic pressure anomaly.

The nonisotropy of a stress tensor implies that a lattice suffers mechanical shear stress. The fact that certain lattices exhibit isotropic stress is well known. See B. Hasslacher, P. Lallemand, Y. Pomeau, U. Frisch, D. d'Humieres and J. P. Rivet, *Complex Systems*, page 649 (1987), who illustrated isotropy of the stress tensor for particles traveling at a single speed along a FCHC symmetry without energy exchange collisions. Lattice symmetries for particle motion have been developed that do not exhibit such isotropic stress. Such lattices include the hexagonal lattice and the FCHC. So as to remove this artifact of discreteness, the present invention utilizes a four dimensional FCHC lattice and has rank four isotropy in all energy levels.

Non-Gallilean invariance refers to the Gallilean factor "g" having a value other than one. A value other than one indicates that the lattice gas fluid has a tendency to behave differently when moving at constant velocity than when at rest. This is primarily a consequence of the stationary lattice in which the fluid is imbedded and will generally lead to non-fluid behavior of the lattice gas.

The Galilean factor, g, appears in the momentum conservation equation, as shown below along with the other discreteness artifacts, $$\rho \left( \frac{\partial}{\partial t} u + u \cdot \nabla g u \right) =$$
↑

-continued $$-\nabla(P - f\rho u^2) - \nabla P^{ANIS} + \text{VISCOUS TERMS}$$
$$\uparrow \qquad \uparrow$$

Except for the three artifacts, indicated by arrows, this is the Navier-Stokes equation of fluid dynamics, with the mass density $\rho$, fluid velocity, u, and pressure, P, indicated. The present invention eliminates both the dynamic pressure anomaly term, $f\rho u^2$ and the anisotropic stress, $P^{ANIS}$, while maintaining $g=1$ throughout the dynamical range.

The final artifact is the dynamic pressure anomaly. Specifically, the pressure depends on the fluid velocity. The reason for this dependence is again a consequence of the lattice being at rest, and is somewhat related to the Gallilean invariance.

The problems of non-Gallilean invariance and the dynamic pressure anomaly are resolved by figuring the energy degree of freedom into the system. The Gallilean factor "g" is directly affected by the rate of the forward energy collisions and the rate of the inverse energy collisions. The rate of the forward and inverse energy collisions is selected so as to force "g" to be equal to 1 and, thus, force the system to exhibit Gallilean invariance.

The ratio of forward to inverse rates is determined theoretically by the Gallilean invariance condition, $g=1$, to ensure the proper equilibrium. Expressions are developed to give this rate ratio to very high accuracy. The ratio of forward to backward processes can be set to the required value to obtain Galilean invariance without the dynamic pressure anomaly. The pressure anisotropy is resolved by assuring that each energy level processes the rank four isotropy property.

Figure 10:
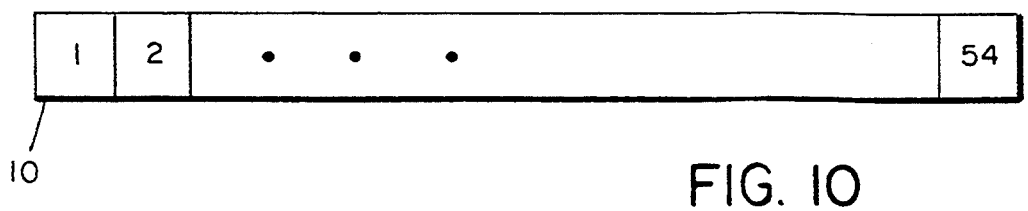
FIG. 10 is an illustration of the bits in a state vector.

As is evident from the above description of the collision process, the system is extremely computationally intensive. So as to make its use practical, the system is implemented on a special purpose parallel processing system. Central to operation of the system is the state vector 10 shown in FIG. 10. In this example, the state vector 10 is comprised of 54 bits that may assume a value of 0 or 1. Each bit position is associated with a given particle selected from the 54 particles that may be present at any given lattice site. Hence, each bit position is associated with a given velocity vector for the associated particle. A 1 in the bit position indicates the presence of the particle, whereas a 0 indicates the absence of the particle. The number of bits in a state vector need not be limited to 54 bits; rather the number of bits is dictated by the number of energies and directions available. Thus, if different energies or different directions are used, or if more particles are allowed per state per site, a different bit length for the state vector may be chosen. In particular, for energy levels zero through four, a 169-bit state vector would be used. In addition, the state vector may allow for different types of molecules and the like.

In order to perform each collision rule, the appropriate bits representing the two colliding particles must be checked to confirm that the particles are present. Then, the bits representing the required holes must be checked; that is, it must be confirmed that the resultant collided particles from a collision are not already present in the state vector. When those two conditions are met, the collision is performed by removing the bits for the colliding particles and generating the bits for the collided particles in the state vector. This logic must be performed for each collision rule, the selected pairs of colliding and collided particles being in accordance with the pairing rules discussed above.

The state vector may allow for more than one particle in any state. Rather than having only a single bit for each state, the vector may be extended to have multiple bits for each state. As an example, rather than storing 54 bits, one could store 54 bytes. Each byte of 8 bits defines up to $(2^8-1)=255$ particles at that site. In that case, the system could be operated such that the main decision of each collision rule would no longer be a question of whether a particular collision should be performed, but rather a question of how many particle collisions should be performed. By operating with a moderate density of particles, one could be assured that many of the required colliding particles would be available at a site and many holes would be available for the collided particles.

For a given amount of memory, providing additional particles per state per site reduces the number of sites which may be processed, but the increased number of particles may be to overall advantage. For example, compare a first system having one bit per state per site, or 54 bits per site, with another system having eight bits per state per site, or $54 \times 8$ bits per site. Thus, for a given memory size, the number $n_2$ of sites in the second system would be one-eighth the number $n_1$ of sites in the first system. However, the number of particles available for collisions in the first system would only be $n_1 \times 54$; whereas the number of particles available in the second system would be $n_1/8 \times 54 \times 255$. That is, the second system, having one-eighth the number of sites would have approximately thirty-two times the number of particles.

A key parameter of interest with respect to mean system accuracy is the Reynolds number which in turn is inversely related to the mean-free path of particles in the system. In a single particle system, the mean-free path is equal to one-half the lattice site spacing. On the other hand, due to the greater likelihood that a collision will occur in the eight-particle per state system, the mean-free path in that system is one-quarter the lattice spacing. With eight times the number of sites, the lattice spacing in the first system is one-half that of the second system in each of the three dimensions. As a result, the mean-free path between the two systems is about equal. On the other hand, the signal-to-noise ratio of the system is proportional to the square root of the number of particles. Thus, the second system has a signal-to-noise ratio of greater than five times ($\sqrt{32}$) of the first system without affecting the mean accuracy which is directly related to Reynolds number.

Two hardware architectures will be described for carrying out the collision rules and subsequent move operations. Each relies on combinational logic to perform the collision rules. With proper selection of the appropriate pairs of bits in a state vector, the combinational logic for each rule is as follows. For each pair of colliding velocity vectors, represented by bits $S_i$ and $S_j$, and corresponding pair of collided vectors, represented by bits $S_k$ and $S_l$, there is a forward collision rule which requires that $S_i$ and $S_j$ be in the state vector and that $S_k$ and $S_l$ be holes. Further, masking bits $M_F$ and $M_B$ are provided by a random number generator at the rates required for the forward and backward collisions. The rate for one direction may be set at unity. The collisions are only permitted where the bit $M_F$ or $M_B$ is set. Thus, the forward collision rule is:

$$R_F = (S_i \cdot S_j \cdot \bar{S}_k \cdot \bar{S}_l) \cdot M_F \tag{1}$$

For the same vector pairs, a backward collision rule may be defined as follows:

$$R_B = (\bar{S}_i \cdot \bar{S}_j \cdot S_k \cdot S_l) \cdot M_B \tag{2}$$

The masking bits $M_F$ and $M_B$ provide different rates of collision between the forward and backward energy transfer collisions.

Only one of the forward and backward rules or neither rule may be performed in any time step. Thus, the individual post collision state bits can be determined from the following logic:

$$(\hat{S}_i) \leftarrow (\overline{R_F} \cdot S_i) + R_B$$

$$(\hat{S}_j) \leftarrow (\overline{R_F} \cdot S_j) + R_B$$

$$(\hat{S}_k) \leftarrow (\overline{R_B} \cdot S_k) + R_F$$

$$(\hat{S}_l) \leftarrow (\overline{R_B} \cdot S_l) + R_F \tag{3}$$

Thus, for example, the collided bit $S_i$ is set high if the forward collision condition $R_F$ is not set and $S_i$ is one, or if there is a backward collision with the condition $R_B$ set.

Also, the system must provide for boundaries. A no-slip boundary condition may be provided by simply reversing the velocity vector of all particles striking the surface. The surface can be defined by a boundary bit B for each site through which the surface passes. Where there is a boundary bit, the above collision logic is suppressed and a parity vector particle is generated for each particle of the state vector. Where C is the logic of equation (3), the post collision state bits with boundary conditions is:

$$\hat{S} \leftarrow (C \cdot \bar{B}) + (\text{PARITY} \cdot B) \tag{4}$$

Other boundary rules may provide for the injection or extraction of energy from the system as by a hot or cold surface.

The present invention has particular application to processing of fluid flow with high Reynolds numbers. The low viscosity required for the high Reynolds numbers is obtained by the great number of collisions performed at each site. In a real fluid, there would be many more particles than allowed by the limited lattice sites of the present system, but collisions are less efficient. For this system, the high efficiency of collisions compensates for the gain in viscosity resulting from the fewer number of particles. The present multiple speed approach substantially adds to the number of possible collisions and thus greatly reduces the viscosity of the system.

Figure 11:
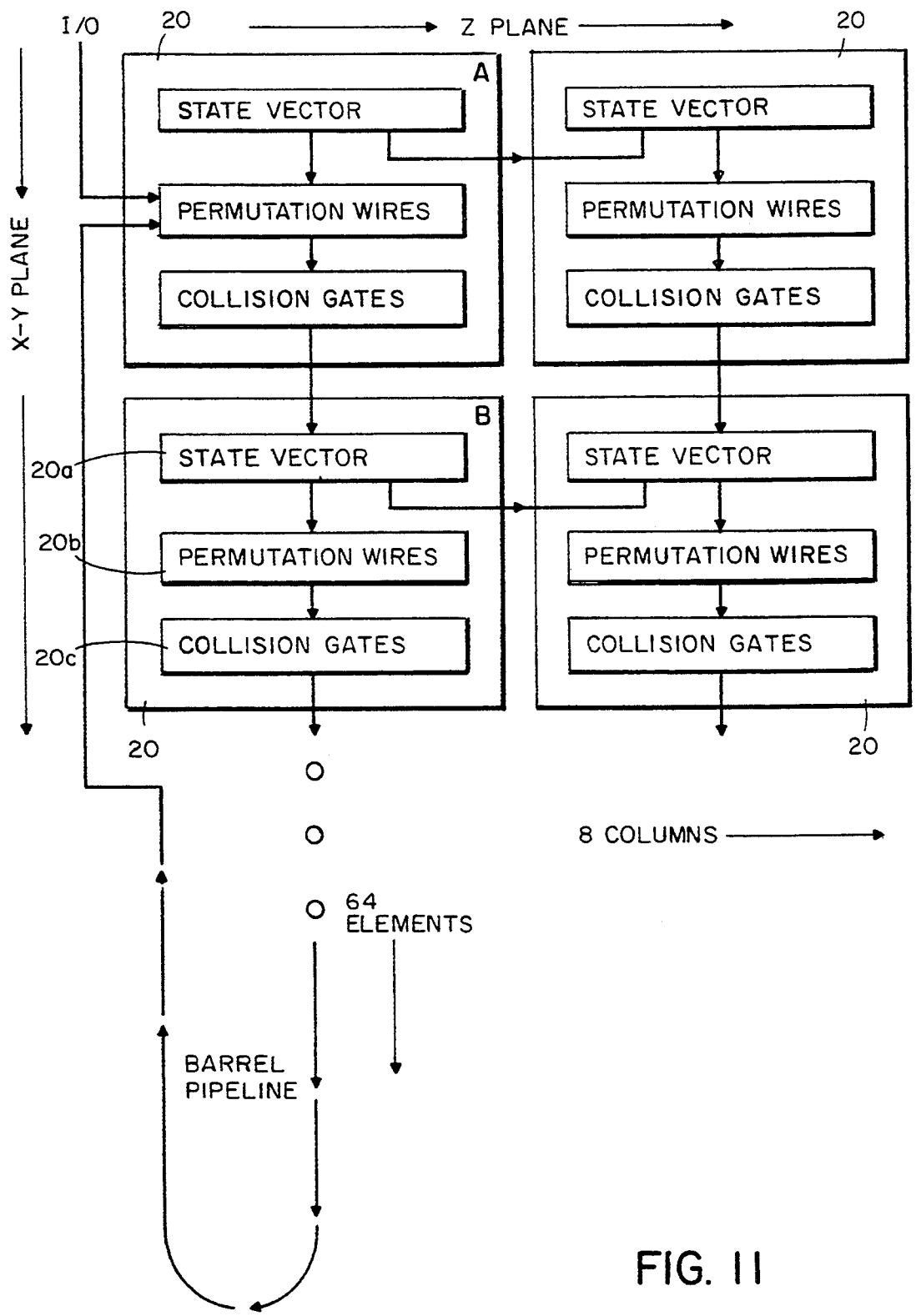
FIG. 11 is an illustration of a processing chip of one embodiment of the invention.

The data processing system in FIG. 11 is comprised of a plurality of chips. Each chip processes state vectors associated with specific lattice sites in parallel. The state vectors are processed to simulate collisions as previously described and to move the particles between lattice sites. There is a mapping from the physical space on the chips into the lattice site spaces.

A typical chip is depicted in FIG. 11. The chip is comprised of 8 columns wherein each column has 64 elements 20 and can be viewed as a large barrel pipeline. Each element 20 processes particle data for a particular lattice site in a cycle. Together, the elements of a pipeline perform the collisions for that given lattice site over the several machine cycles of a time step.

Each pipeline element 20 is comprised of a state vector 20a such as that shown in FIG. 11. The collisions are performed by hardware comprised of permutation wires 20b and collision gates 20c. The permutation wires 20b establish appropriate permutations to obtain particle pairs and hole pairs. The collision gates 20c (see FIG. 12), in contrast, perform the logical operations (e.g. AND, OR, etc.) necessary to effect the collisions according to equations 1, 2, 3 and 4. These collision gates 20c receive bits according to the particle pair selected and account for the energy transfer collisions by establishing appropriate particle pairs. The collision gates 20c are at most two logic gates deep of AND gates and OR gates. The permutation wires may be comprised of 54 horizontal wires that extend across all of the collision gates. In essence a wire is provided for each bit in the state vector and thus, each set of the collision gates has access to such bits. The pipeline is 64 elements. Thus, after 64 machine cycles the state vector corresponding to site A returns to element A. All state vectors are then in position for movement of individual bits along the lattice depending on the direction and energy of the particle represented by the bit.

As mentioned above, columns of the chip are comprised of 64 elements. The mapping from the physical space to the chips is such that each column constitutes an XY plane. The mapping begins with X and Y at 1. Y increases along the column until it reaches the value of 8 at which point the X value is incremented to 2. The subsequent columns constitute new Z planes of the physical volume space. Given the 64 pipeline elements 20 and the 8 columns, it is evident that $8 \times 64$ or 512 lattice sites are processed for each chip. The chips are arranged, for instance, into $8 \times 8 \times 8$ cubes 103 of chips shown in FIG. 14 which in turn are organized into a volume 102 of 100 cubes. More generally the chips are configured to handle 100 regions of fluid (where a region of fluid is handled by a $8 \times 8 \times 8$ cube) that may be mapped to the processor blocks in many different ways. This configuration produces approximately $10^4$ chips per machine to give a raw process power of $9 \times 10^{15}$ bit operation per second. A volume of fluid to be processed is mapped into the volume 102 of processing elements.

Movement between lattice sites in adjacent columns is provided by shifting. In particular, an element of a state vector from a first column may be shifted to its corresponding pipeline element in the immediately adjacent column or chip. This ability to shift bits to an adjacent pipeline enables the movement stage of the system. Hence, particles may be moved from one state vector to another.

The system is designed so that each chip works according to a 30 megahertz clock. The chips take a maximum of 90 clock cycles to process lattice sites for a single time step of the simulation. It is preferred that there are approximately 200 data pins per chip. Given the 90 clock cycles to process the lattice sites for a single time step and the previously described raw processing ability, it is apparent that each chip can perform $10^8$ site updates per second.

Figure 13:
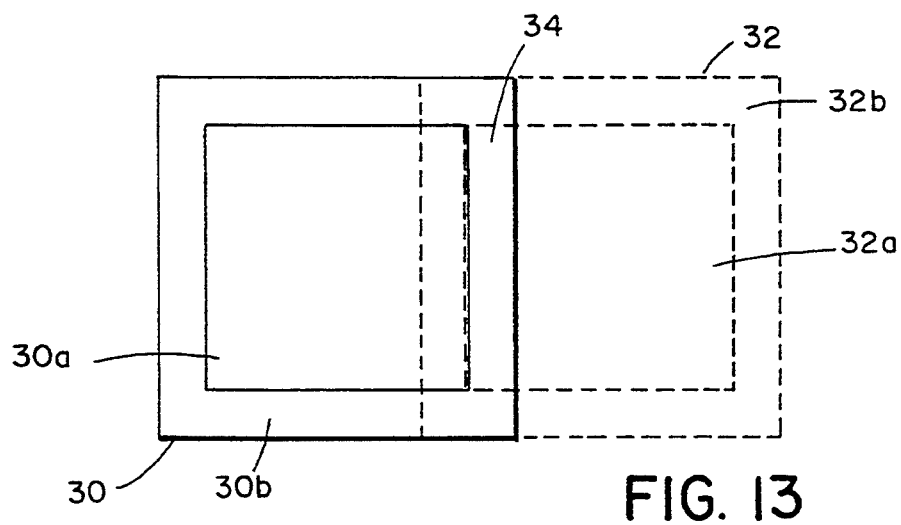
FIG. 13 is an example of the overlapping strategy employed to remove contaminated data.
Figure 14:
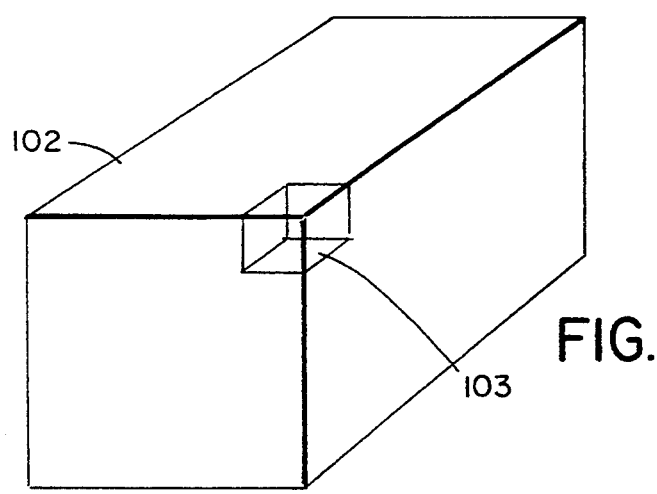
FIG. 14 depicts the mapping of a volume of fluid into the processing arrays.

The processing of a volume of fluid proceeds in a sequential manner. To illustrate how the system operates, an example mapping is illustrated in FIG. 13. Suppose that a first volume of fluid 30 is processed initially in a $8 \times 8$ cube of chips 103 such as shown in FIG. 14 for a given number of time steps. Since this volume 30 is processed in isolation, the particles located at the outer boundary of the volume will not be processed in a manner that accurately reflects their true behavior. The reason for this difficulty is that particles from other volumes that might collide with these boundary particles are not taken into account. As such, after several time steps, the volume 30 will be comprised of an inner volume of particles 30a that is correct and an outer volume 30b that is contaminated. The depth of the outer region 30b directly corresponds to the number of time steps because for each time step an external particle can affect one level of depth in the volume of fluid 30.

When the next volume of data 32 is processed, it is selected so that it overlaps with the region 30. It overlaps for a large enough extent to cover the contaminated region of volume 30. In particular, when the volume 32 is processed it will have an outer region 32b of contaminated data and an inner region 32a of proper data. This inner region 32a includes the region 34 of data that was previously contaminated for volume 30. The illustration in FIG. 13 is shown strictly for a right side of the volume 30. The remaining sides of the contamination region 30b are corrected in similar fashion for subsequent volumes that are positioned to overlap those respective edges of the contaminated data 30b.

The system thus operates on each volume of the fluid in sequential order until all volumes have been properly processed. Once all of the volumes have been properly processed, the system begins again with the first volume for a new round of time steps. This process is repeated until the simulation is completed.

To initialize the above described process, each of the state vectors must be set for all of the lattice sites. This is done by software that assigns a value to each state vector. The user of the system must initialize the state vectors so as to accurately reflect the fluid to be modelled.

Figure 15:
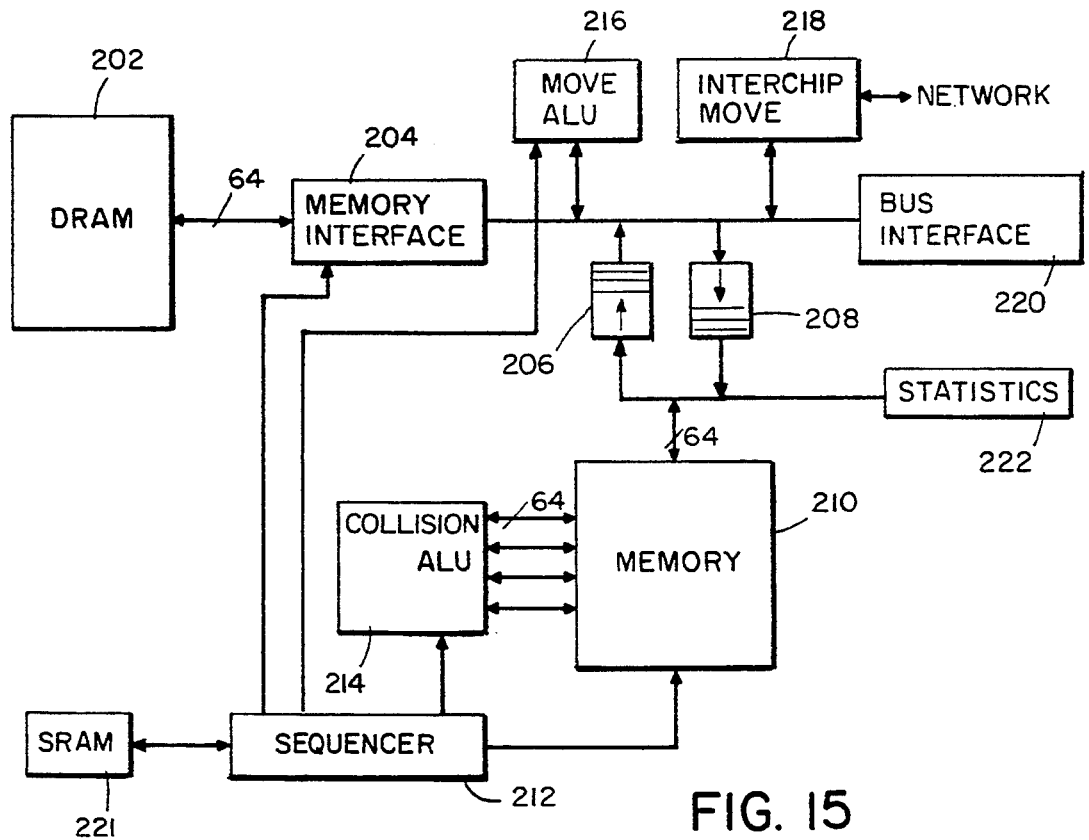
FIG. 15 is a block diagram of an alternative processor emboding the invention.
Figure 16:
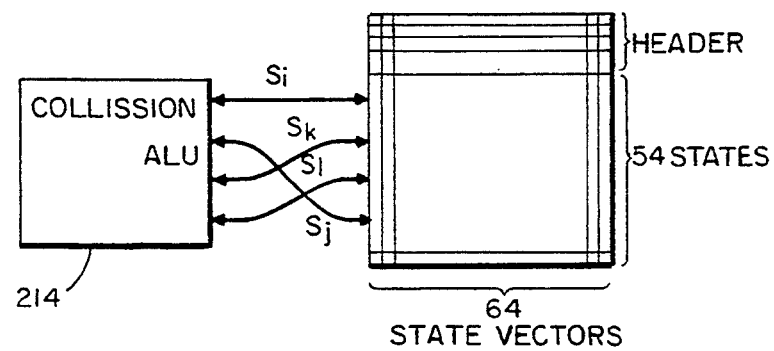
FIG. 16 is a schematic illustration of the state vector data for a 4×4×4 block of sites processed in the ALU of FIG. 15.
Figure 17:
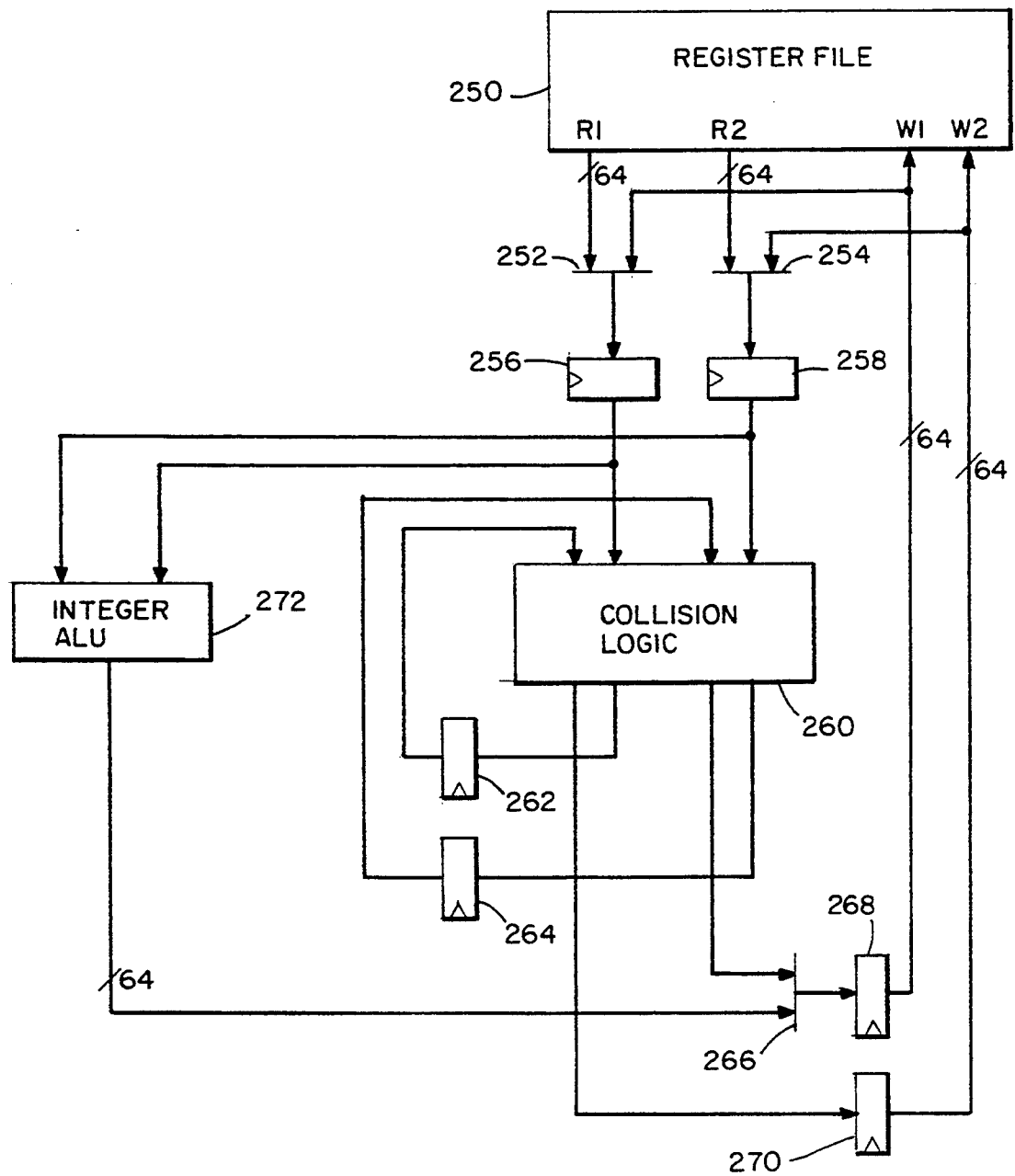
FIG. 17 is a detailed illustration of an alternative memory and collision ALU for use in the processor of FIG. 15.
Figure 18:
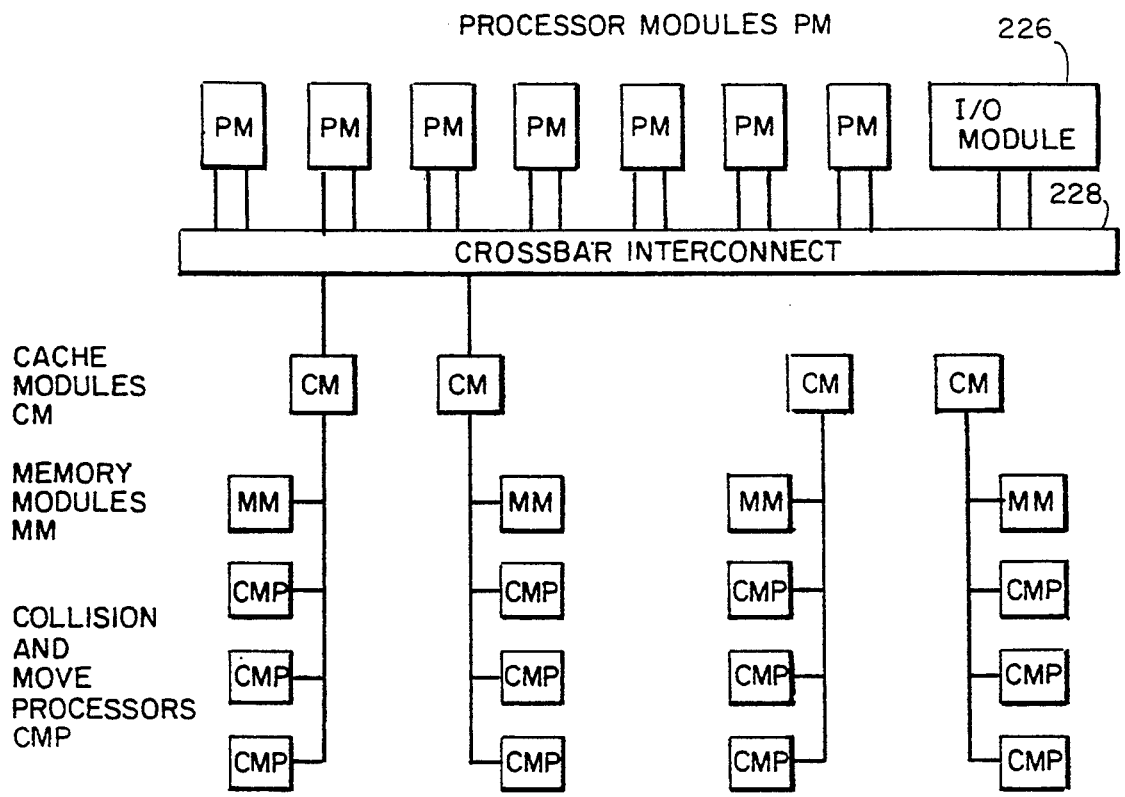
FIG. 18 is a schematic illustration of a multiprocessor system using the processor of FIG. 15.

A second architecture for implementing the present invention is illustrated in FIGS. 15 and 16 with modifications of that architecture presented in FIGS. 17 and 18. Preferably, the system is a massively parallel processor system and FIG. 15 illustrates one processor of the system. At each node of the processing system, multiple blocks of lattice sites are processed in series. In one implementation, the lattice space is divided into blocks of $4 \times 4 \times 4 = 64$ sites. Many such blocks are stored in dynamic random access memory 202. The blocks of site data are fetched a 64 bit word at a time by memory interface 204 and applied through a FIFO 208 to a processing memory 210. Preferably the processing memory 210 is a four-port static RAM each port transposing a 64-bit word to and from a collision processing ALU 214. After processing, a block is returned to DRAM 202 through FIFO 206.

A block of state vector data retrieved from DRAM 202 and held in processing memory 210 is as illustrated in FIG. 16. A state vector of 54 bits is provided for each of the 64 lattice sites of the block. Additionally, header information which applies to the entire block is stored in a header. That header information may include masking information for each site, as well as diagnostic, statistical, geometric and fluid variable information for the block.

In the implementation shown, only one collision rule is processed at a time. However, to obtain significant parallelism in the ALU 214, the same collision is performed on each of the 64 sites simultaneously. Thus, a sequencer 212 selects the four states $S_i$, $S_j$, $S_k$ and $S_l$ required in a particular collision. Those state bits for all 64 sites are read as site vectors simultaneously into the ALU. There, each set of four bits for each site is applied to a combinational logic unit which performs the logic of equations 1, 2, 3 and 4. The ALU includes 64 such combinational logic units operating in parallel. The outputs of that combinational logic are then read back into the memory 210. Then, the sequencer 212 selects a new set of four states so that the ALU can perform the next collision.

To provide additional throughput, the site vectors of more than four states may be selected at a time, and plural collisions may be performed simultaneously for all sites.

The Statistics unit 222 is used to collect and compile information about the simulation run. The statistics information is stored in the header of each cube. The unit maintains eight 16-bit accumulators. The accumulators are used to collect information about the volume of data as it is passed into and out of the Collision Processor.

Essentially, the accumulators are used to determine the net velocity vector of the volume being processed. To calculate this, three accumulators are used, one for each of the x, y, and z dimensions. Each accumulator sums up the weighted (by speed) total of particles moving in that dimension. Particles moving in a negative direction are subtracted from the total. Particles moving in multiple dimensions are added (subtracted) to each of the dimensions. Each 64-bit word represents up to 64 particles in the block moving a particular direction and at a particular speed. The Statistics Unit generates a population count on each word to determine how many particles in the block are moving in that direction. The 7-bit count then is scaled up by a 3-bit factor to account for the speed of the particles (5 speeds). The resulting 10-bit value is added or subtracted to the appropriate accumulators.

Once all collisions for a block have been performed, the move ALU 216 performs the move operation on the particle representations. Most of the moves need only be made within the block of 64 sites. Thus, most state bits, which do not change during the move operation, need only be shifted within the 64-bit word representing that state for all sites of the block. The shifting will differ between state bits, but will be the same for a single state throughout the 64 bit block. To simplify the shifting, the move ALU 216 may shift the bits within the 64-bit word sequentially in each of the x, y and z dimensions. Some bits must be shifted to other blocks handled by the processing node. Thus those bits must be stored by the move ALU 216 until the block into which they are being shifted is processed by the move ALU. Finally, a few bits must be shifted to blocks being processed by other nodes of the system. Those bits are transferred through an interchip move processor 218. To allow for system set up, control and the like, and perhaps some interchip moves, a bus interface 220 is provided.

The sequencer 212 controls the entire processor with the exception of the bus interface 220. It gets its instruction from a SRAM based control store 221.

Figure 12:
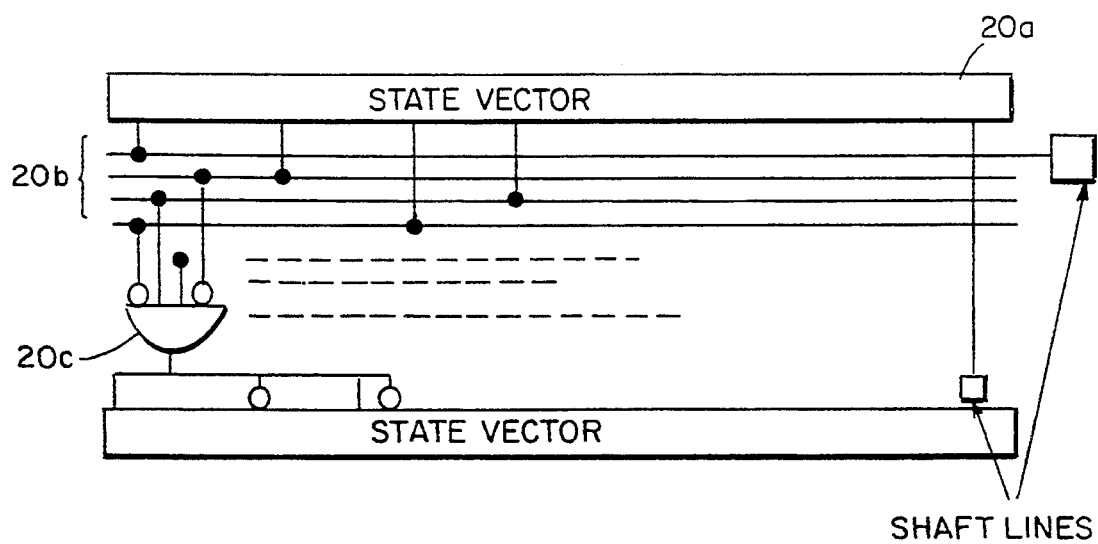
FIG. 12 is an enlarged view of a pipeline element of FIG. 11.

As in the embodiment of FIGS. 11 and 12, this embodiment performs collisions by applying sets of four bits of a state vector, at a 3D lattice site, to combinational logic to generate post collision state bits. Because each collision is effected by proper selection of state bits applied to simple combinational logic which is consistent for all collisions at all sites for all time steps, the data can be processed thousands of times more rapidly than would be possible with a conventional programmed general purpose computer. In both systems, many collisions are performed at each site of a volume in each time step; thereafter the state bits are shifted to other sites according to the directions and energies that they represent in order to effect particle movement.

In the first embodiment, the bits of the state vector applied to the combinational logic are selected by hardwired permutators, a set of permutators operating independently for each lattice site and selecting multiple collisions in parallel for the lattice site. In the second embodiment, the particle selection permutations are performed by the sequencer. The sequencer at a node selects the state bits required for only a single or a few collisions at a time but selects the bits of 64 sites for processing by the ALU in parallel. Since the sequencer is readily programmable, it provides great flexibility in size of the state vector and in the collision rules as is required for such modifications as additional energy levels. The shifting in the second embodiment is also programmable for greater flexibility.

In the second embodiment, 64-site blocks of site data are fetched sequentially from memory at each processing node, and an entire multiblock volume may be processed in a time step before a block is again fetched and processed. Therefore, the problem of contaminated regions as illustrated in FIG. 13 does not occur.

The above description deals with the example of a 54-bit state vector, that is, where there is only one particle per state per site. In the case of eight bits per state per site to provide for up to 255 particles per state per site, each of the 64-bit words read from memory into the collision ALU might include the eight bits required for each state from only eight sites. The eight sites would be of a 2×2×2 block of sites rather than the 4×4×4 block described above.

An alternative to the four-port memory 210 and collision ALU 214 of FIG. 15 is illustrated in FIG. 17. Here the memory 210 is replaced by a 256×64 bit register file 250 which only has two read and two write ports. Thus, only two 64 bit site vectors can be read and written back simultaneously. In order to provide site vectors for four states to the collision logic 260 from the register file 250, the file must be cycled twice. A first pair of 64-bit words are first passed through multiplexers 252 and 254 into registers 256 and 258. On a first cycle the words from registers 256 and 258 are applied to the collision logic 260 but no operation is performed. Thus, the same site vectors for the same two states are output to registers 262 and 264. In the next cycle, those vectors are applied to the second pair of inputs to collision logic 260 along with the vectors from registers 256 and 258 which represent a new pair of states. The collision operation is performed.

One of the state outputs is applied through a multiplexer 266 to register 268 and another is applied to register 270. Both of those outputs are returned to the write inputs of the register file. The other two outputs are returned through registers 262 and 264 to the input of the collision logic. These modified states may then be used as the inputs in the next collision rule. Thus, each set of two states is passed through the collision logic twice, albeit in modified form. Thus, so long as states can be reused in successive collisions, collisions can be performed once per cycle once the pipeline has been filled. If there are no remaining collision rules to be performed that include the two states in registers 262 and 264, no operation is performed in the collision logic and the states are output to the respective registers 260 and 270. Two new states are read in to be used for a valid collision in the next cycle.

Multiplexers 252 and 254 allow the outputs from registers 268 and 270 to be returned as inputs to registers 256 and 258.

The unit of FIG. 17 also includes an integer ALU 272 in parallel with the collision logic. The ALU 272 may perform integer arithmetic and logical processing on two 64 bit words to provide a 64-bit output. This ALU is particularly useful in performing multigrid processing as discussed below. To that end, it includes conventional add, subtract, shift and logical operations and additionally includes a population count operation for counting particles within 8 site subblocks of the 64 site block.

The processing module of FIG. 15 may be a node within a multiprocessor network of independent nodes. However, FIG. 18 illustrates use of the processing element of FIG. 15 fit into the memory system of an Alliant FX/2800 computer system. The Alliant system includes up to seven processor modules PM, each of which supports a 64-bit microprocessor. An I/O module 226 carries an additional microprocessor. The microprocessors communicate with each other and a shared memory system through a crossbar interconnect 228. Within the memory system, cache memory modules CM link the processor modules to an array of memory modules. In the present implementation, memory modules MM are retained in the memory array, but many memory modules are replaced by memory mapped collision and move processing modules CMP. The CMP modules contain the typical system interface to banks of DRAM but also contain 16 processors, each as illustrated in FIG. 15. Each processor is implemented as a special purpose integrated circuit chip which communicates with the DRAM 202, SRAM 218 and other processors on the CMP module and, through a bus interface (not shown), to the system memory buses and cache memory CM.

Figure 19:
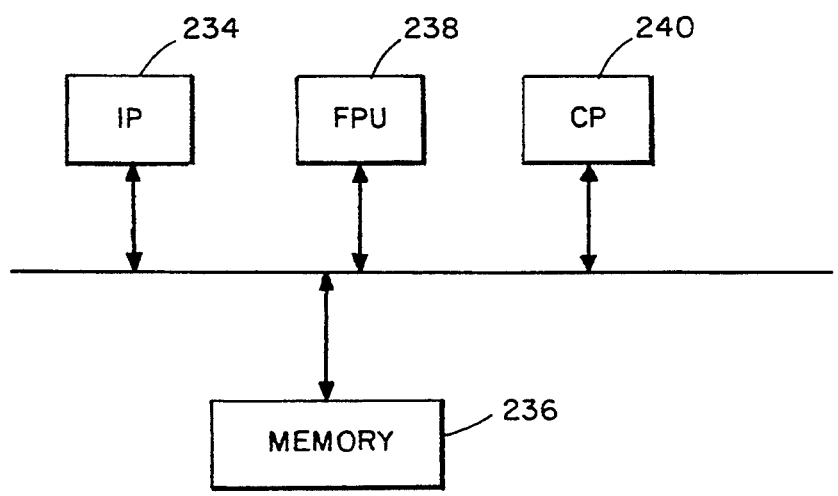
FIG. 19 is an alternative implementation of a collision processor as an addition to a conventional processor.

In a further implementation of the invention, the collision processor of the present invention may be closely linked to a conventional processing element as an accelerator and even be combined with the conventional processor on a single microprocessor chip. Thus, as illustrated in FIG. 19, a main instruction processing unit 234 may handle basic ALU operations on data in memory 236 and call upon a floating point unit 238 to handle floating point operations and a collision processing unit 240 to handle collision processes of the present invention. In that case, the collision processor would likely include the collision processing ALU 214, memory 210 and a sequencer 212. However, move operations would likely be handled by the main instruction unit 234.

In wind tunnel applications, the object under study must present a very small cross sectional area, relative to the tunnel cross section, if accurate drag values are to be obtained. The rule of thumb in wind tunnel design is that with over 5% blockage of the tunnel, accurate drag measurements cannot be obtained, and even below 5%, corrections typically have to be made. This condition is required by the long range of the pressure distribution in the potential flow region far from the object, not from complex flow structures. This condition carries over to simulations. However, the computational work of evaluating the outer regions of flow become prohibitive. Even in a literal simulation, where one simulates the entire boundary layer and wake with sufficient resolution to have a true Reynolds number in that region, it is not desirable to continue this resolution out to the walls and tunnel ends to the extent required by the blockage condition. Thus, there is a need for a variable resolution grid in computer simulation of fluids.

A variable resolution lattice gas algorithm must mesh together lattices of different scale, presumably integral multiples of one another, joined along lattice interfaces. Such a matching of lattices, although geometrically feasible, would seem to destroy the special lattice properties required in the particle motion to render the dynamics continuous. At the very least, non-hydrodynamic stresses would be expected to appear as a consequence of the interface.

In what must be regarded as another remarkable property of the lattice gas algorithms, it is possible to construct an interface algorithm that can erase the interface from the continuum dynamics in much the same way that the lattice itself can be erased from the dynamics in the uniform grid lattice gas. Such an interface algorithm is presented below, and it is shown that in the inviscid (Euler equation) limit there are no interface artifacts in the dynamics. In effect, the Euler dynamics do not depend on lattice scale. Lattices of rather arbitrary scale doublings can be joined together essentially arbitrarily without altering the fundamental continuum hydrodynamic behavior of the system. The viscosity, which depends linearly on the mean free path and, therefore the lattice scale will vary across an interface. In practice this means that interfaces can be introduced without affecting the dynamics in one of two extreme cases. A first case is in regions of potential flow where the flow is independent of viscosity. Here increasing grid scale and therefore viscosity may by helpful in forcing the flow to relax to potential flow. Long wavelength sound waves and related disturbances can last very long in such overresolved regions, and the larger viscosity that comes from the coarse grid will help damp these out faster. Second in regions of high turbulence, where the Euler dynamics are dominant, multigrid interfaces can be used.

The conditions at the interface can be determined by requiring that all physical parameters be continuous across the interface. The discrete nature of the algorithm demands that the lattice scale change by some integer multiple in going across the interface. We restrict consideration here to changes in scale of 2x per dimension, to minimize the magnitude of viscosity changes. Larger changes can be cumulatively generated, of course. This means that the physical volume associated with each lattice site increase by a factor of eight in crossing from a fine to a coarse grid.

A key to preserving the physical properties across the interface is to keep the microscopic particle velocities, $c_i$, unchanged. Particles have the same set of directions and speeds in all lattices. To counteract the eightfold change in lattice site density, we simply assign 8x the mass to particles in the coarse region. This makes the microscopic dynamics completely continuous. Mass, momentum, and energy density are trivially continuous, and since the thermodynamics is identical, the sound speed is continuous as well. In fact the only difference between the various lattices is sampling accuracy per unit volume (and the viscosity, of course, if one goes beyond the Euler level of dynamics). The coarser regions are noisier—which doesn't matter as long as the phenomena are resolved.

Figure 20:
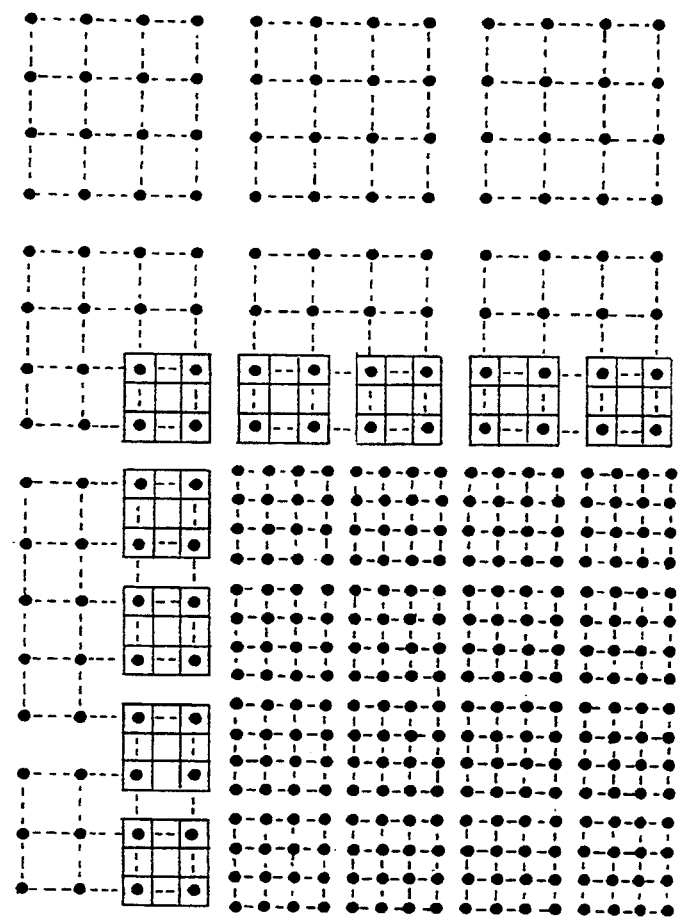
FIG. 20 illustrates the interface geometry of multiple grids in two dimensions.

The geometry of the interface is depicted in FIG. 20. FIG. 20 is a two-dimensional projection of an interface. 4×4×4 blocks of sites processed together in the collision ALU as discussed above are indicated by the broken-line connections. For clarity of illustration, only 4×4 blocks in two dimensions are illustrated.

FIG. 20 illustrates a coarse lattice in the upper left and a fine lattice in the lower right. The two lattice structures overlap in a region indicated by square grids. In the overlapping region, each intersection of the square grids corresponds to a fine grid lattice site. To allow for two particle speeds, the fine grid extends two sites into the coarse grid. To simplify computation, the fine grid interface blocks are restricted to overlay 2×2×2 corner blocks of the 4×4×4 coarse grid blocks.

A fundamental question in the design of a multigrid system is how the grids will interface; that is, what happens when particles reach the end of one grid and need to move on to the next grid? The object is to create a system which permits a smooth transition from one grid to the next, minimizing the artifacts of the interface. Hopefully, we can remove all artifacts of the interface in the same way that the lattices themselves are 'erased'.

Figure 21:
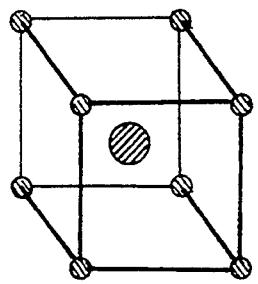
FIG. 21 illustrates the interface between individual particles of adjacent grids.

The system we have devised for interfacing the two grids can be described as follows. Consider first a uniform grid of grid length equal to one, containing particles of mass one. In areas where high resolution in unnecessary, we combine a cube of eight sites into a single site as illustrated in FIG. 21, thus decreasing the resolution by a factor of two. The new site is placed at the center of the eight sites. This 'coarse lattice' will have a grid length twice as great as the original 'fine lattice' and particles on the new lattice will be of mass eight. Since the grid length has been doubled but the velocity of the particles is unchanged, particles on the coarse lattice will move half as frequently as those on the fine lattice.

In order to allow for transitions from one grid to the next, we must define a region of space which is occupied by both lattices simultaneously, which is called the interface. In keeping with the description above, a coarse grid lattice site in the interface is located in the center of eight fine grid sites; in essence, the cube of fine grid sites and the single coarse grid site represent the exact same volume of space. When particles are moved into the interface they are translated onto the adjacent grid, which prevents them from moving off of the lattice structure.

Figure 22:
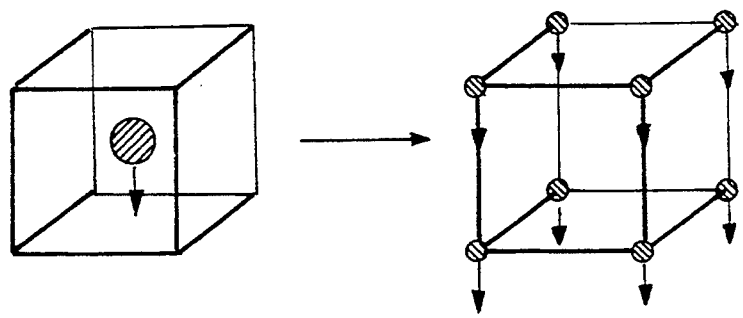
FIG. 22 illustrates the transition from a coarse particle to fine particles at the grid interface.
Figure 23:
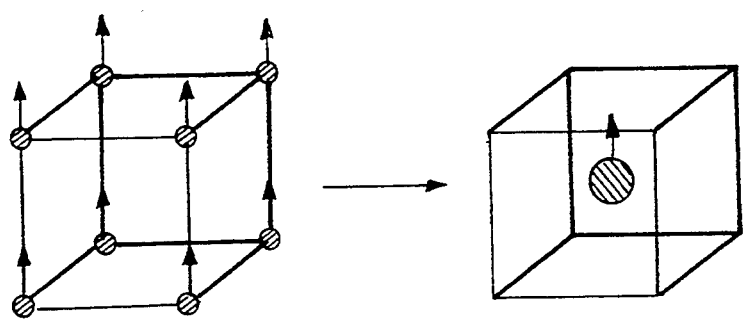
FIG. 23 illustrates the transition from fine particles to a coarse particle at the grid interface.

Transitions of particles from a coarse grid to a fine grid are a simple matter, since we are gaining resolution in the transition. As illustrated in FIG. 22, if a particle in the interface on the coarse grid is directed into the fine grid, it is simply 'exploded' out to the eight finegrid sites which are associated with the coarse grid site in the interface. Since we have a mass eight particle being converted into eight mass one particles with the same velocities, the fundamental quantities (mass, momentum, and energy) are conserved exactly to first order. Further, since the 'average location' of the eight particles is the original location of the mass eight particle, we have not introduced any external mass, momentum, or energy flux into the system. Of course, we must guarantee that the fine grid sites are empty to prevent double-population of the sites, but this is a relatively simple matter by limiting the collision rules which may occur within the interface.

Much more difficult are the transitions from the fine grid to the coarse grid. Since we are losing resolution in this transition, it is not possible to exactly preserve the information on a microscopic and instantaneous level. However, we can design a system which preserves the information macroscopically and over periods of time.

The interface pairs a cube of eight fine grid sites with a single coarse grid site. We note that if every site on the fine grid cube has a particle in a given state as illustrated in FIG. 22, these eight particles may be 'coalesced' to form a single particle of mass eight. This particle could be placed on the corresponding coarse grid site, and the fundamental quantities are all exactly preserved.

However, this cannot be done if there are sites on the cube which do not have particles in this state. In this case, we cannot have a microscopically exact preservation of the particles as they move through the interface. Instead, we would like to preserve the fundamental quantities macroscopically and over time. We do this by changing the partially-populated cube into one of two situations which we can handle exactly: an empty cube, in which no transition occurs, or a full cube, which is 'coalesced' as described above.

This is done by employing 'antimatter' in the interface. Each coarse grid site in the interface has an allotment of antimatter of up to eight particles per state. There is a corresponding antimatter state for each state of matter particle—the antiparticle has the same velocity as the regular particle, but its mass, momentum, and energy are equal and opposite. Therefore, a matter-antimatter pair has exactly zero mass, momentum, and energy. Although the antimatter has momentum, it does not propagate through the system—it remains bound to its site.

Figure 24:
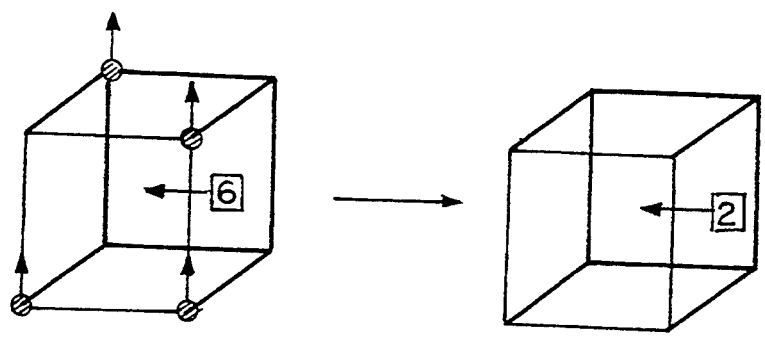
FIG. 24 illustrates the annihilation of fine particles in a transition from the fine grid to the coarse grid.

The transition is handled as follows. The population of matter particles on the eight fine grid sites of the cube is counted to give a population count k. If there is at least as much antimatter a at the corresponding coarse grid site as matter on the fine grid sites, i.e., $a \geq k$, then the matter and antimatter 'annihilate': the matter is removed, the antimatter is decremented to $a-k$, and no coarse grid particle is created. Since the matter-antimatter pair has zero mass, momentum, and energy, this annihilation does not change the fundamental quantities of the system. This operation is illustrated in FIG. 24 where the antimatter count a for the coarse site is presented in the square.

Figure 25:
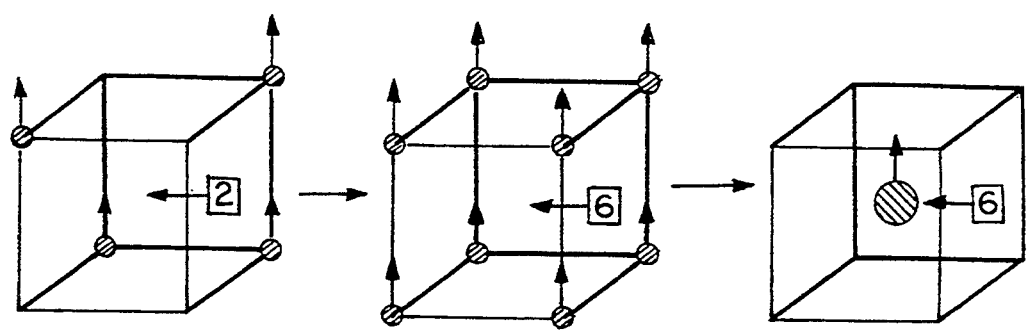
FIG. 25 illustrates the creation of a coarse particle and antimatter in a transition from the fine grid to the coarse grid.

If there is more matter than antimatter as illustrated in FIG. 25, we cannot do this. Instead, we create matter-antimatter pairs (once again, without changing the mass, momentum, and energy of the system) until we have eight matter particles. These are then 'coalesced' into one particle of eight times the mass, which is then placed on the coarse grid at the central site. The antimatter count for the site becomes $(8-k+a)$.

This provides us with a means of handling the transition from the fine to the coarse grid with no macroscopic loss of information concerning the fundamental quantities of the system. Further, because of the randomness of the system, any minute momentum or energy flux which may be introduced by the centralization of the antimatter will tend to average out. As a result, the transition of particles from the fine grid to the coarse grid is achieved with no ill effects macroscopically.

Let us assume that particles on the fine grid move on every time step. Then, as defined above, particles on the coarse grid must move every other time step. It makes sense to perform the interface operations on the time scale of the coarse grid. The operations should not be done any more frequently than that, since the coarse particles will not have had time to propagate into the interface; and doing the operations less frequently would require a deeper interface, which is less accurate and has no apparent benefits.

Since the coarse interface will have one time step to move between interface operations (and the fine grid will have two steps), the depth of interface required is defined by the velocities of particles in the system. That is, a coarse particle with a velocity component of one in the direction of the interface will move one row into the interface before it is exploded; likewise, a fine particle may move two rows into the interface before being coalesced. Since a single interface layer (as described above) would consist of one coarse grid layer and two fine grid layers, a $2 \times 2 \times 2$ fine grid cube would be sufficient for a one-speed system.

As additional speeds are added to the system, however, a deeper interface is necessary for particles which have velocities greater than one in the direction of the interface. Since the speed of a particle is equal to half of the sum of the squares of the components of the velocity, an interface of depth n will suffice for systems with speeds up to (but not including) $\frac{1}{2}(n+1)^2$. This means that a system with four speeds can be represented with an interface of only two coarse grid rows.

Within the interface, collision rules which create particles of increased speed are avoided. Particles of different speeds are handled in like manner but independently from each other.

It is important to note that the 'extended interface' is only used when necessary; if a particle in a four-speed system only has a velocity of one in the direction of the interface, it will not use both rows of the interface; it will only coalesce and explode in one of the rows. This keeps the amount of antimatter used in the system to a minimum.

This system, while providing an effective means of managing the transition of particles through the interface, does have a potential artifact. Since the antimatter particles are all directed in one direction (from the fine grid to the coarse grid), there is a fairly substantial quantity of momentum which is accumulated in the interface. If the system is relatively time-invariant, this is not a problem. However, it could cause trouble if our fluid system varies over time.

In order to counteract this, we may also allow for the existence of antimatter directed from the coarse grid to the fine grid. This is done by allowing the creation and annihilation of matter-antimatter pairs directed into the fine grid, instead of into the coarse grid. Since this 'down antimatter' (the other form being dubbed 'up antimatter') is not necessary for the operation of the interface, we are free to control its rate of creation and annihilation. We can design the system so that the momentum stored in the down antimatter will cancel the momentum in the up antimatter, giving us zero net momentum in the interface.

There is a fundamental difference between up and down antimatter. Rather than thinking of the down antimatter as being stored as a centralized accumulator, we can consider it to be stored at the local fine grid sites in the interface—this allows us to use ordinary bitwise logic in performing the down antimatter operations, rather than the arithmetic operations required for the up antimatter. As with up antimatter the down antimatter is retained within the interface while the corresponding down matter which is created is free to travel down into the fine grid.

We can calculate the equilibrium levels for both the up and the down antimatter particles. These values may then be compared with simulation results to verify that the antimatter system is behaving as we expect. Further, we can use the predicted equilibria to seed the antimatter particles to the appropriate level. This will allow us to prevent the creation of 'shock waves' which would result from the creation of matter-antimatter paris required to bring the antimatter system up to its equilibrium level.

We can calculate the equilibrium level of the up antimatter by considering the probabilistic behavior of the matter and antimatter particles in a given section of the interface individually. For any state i, there is a probability $n_i$ that a given site contains a particle in that state, and a complementary probability $\bar{n}_i$, that the state is vacant. We can analyze antimatter in an analogous fashion if we think of the antimatter accumulator (which is bound to a coarse grid interface site and can carry a value from zero to eight) as representing individual antimatter particles on the corresponding fine grid cube. Using this representation, there is a probability $a_i$ of finding an antimatter particle at a given fine grid interface site, and a likelihood of $\bar{a}_i$ that the state is empty. Since each state acts independently of all the others, we will hereafter drop the subscript i.

Given these probabilities, we can now analyze a given fine grid cube in the interface. The probability of finding exactly k particles of matter on the cube is:

$$P_k = \binom{8}{k} n^k \bar{n}^{\bar{k}} \quad (1)$$

where $\bar{k} = 8 - 1$. Correspondingly, the probability of finding exactly l antimatter particles on the cube is:

$$P_l^* = \binom{8}{l} a^l \bar{a}^{\bar{l}} \quad (2)$$

where $\bar{l} = 8 - 1$. Thus, the probability of finding k matter particles and l antimatter particles on a given cube is equal to $P_k P_l^*$.

As we stated above, the matter and antimatter will annihilate if there is at least as much matter as antimatter. Therefore, the total annihilation rate of matter-antimatter paris can be expressed as:

$$A = \sum_{l=0}^{8} \sum_{k=0}^{l} k P_k P_l^* \quad (3)$$

On the other hand, we will need to create matter-antimatter pairs to fill the cube with matter if there is not enough antimatter to annihilate all of the matter:

$$C = \sum_{k=1}^{8} \sum_{l=0}^{k-1} (8-k) P_k P_l^* \quad (4)$$

We achieve equilibrium when the annihilation rate is equal to the creation rate:

$$0 = C - A \quad (5)$$

$$0 = \sum_{k=1}^{8} \sum_{l=0}^{k-1} (8-k) P_k P_l^* - \sum_{l=0}^{8} \sum_{k=0}^{l} k P_k P_l^* \quad (6)$$

$$0 = 8 \sum_{k=1}^{8} \sum_{l=0}^{k-1} P_k P_l^* - \sum_{k=1}^{8} \sum_{l=0}^{k-1} k P_k P_l^* - \sum_{l=0}^{8} \sum_{k=0}^{l} k P_k P_l^* \quad (7)$$

$$0 = 8 \sum_{k=1}^{8} \sum_{l=0}^{k-1} P_k P_l^* - \sum_{k=0}^{8} \sum_{l=0}^{8} k P_k P_l^* \quad (8)$$

$$0 = 8 \sum_{k=1}^{8} \sum_{l=0}^{k-1} P_k P_l^* - \sum_{k=0}^{8} k P_k \quad (9)$$

We note that the last term is identically equal to 8n, the average number of matter particles on the cube. Therefore, we can express the condition for equilibrium of the up antimatter as:

$$0 = 8 \sum_{k=1}^{8} \sum_{l=0}^{k-1} P_k P_l^* - 8n \quad (10)$$

This equation may be solved to find the equilibrium antimatter density a. Plotting the above expression as a function of a and n shows that in the region of physical applicability ($0 \leq a, n \leq 1$), the solution, which is the locus of n and a points that satisfy equation (10), is unique even though the equation is highly non-linear.

In fact, the solution of the above equation for a given n is quite accurately fit by the following quadratic expression:

$$a = 0.230 + 0.450n - 0.0641n^2 \quad (11)$$

Unlike the up antimatter, whose creation and annihilation are forced, the down antimatter is 'free'; that is, we can control the creation and annihilation rates to achieve the desired equilibrium level. Our goal is to establish the equilibrium level $a_{-i} = a_i$, where i is an up-state and $-i$ is the corresponding down-state, the parity state of i. (We will always use $-i$ to indicate a down-state.)

Since the down antimatter is stored on the fine grid (and not delocalized like the up antimatter), we can describe the creation and annihilation of the down antimatter in logic:

$$C = \bar{a}_{-i} \bar{n}_{-i} R_c \quad (12)$$

$$A = a_{-i} n_{-i} R_a \quad (13)$$

The first two terms of each expression guarantee that the operation is possible. For creation, there must be no down particle or down antiparticle; for annihilation, there must be both. The third term is a rate coefficient which we are free to control.

The rate coefficient may be set for individual sites based on the above equilibrium computation. However, we would like to use the up antimatter to 'catalyze' the creation of down antimatter. In that case, we only want to create a down matter-antimatter pair if there exists an up antimatter (i.e., in the parity state of the down pair) particle at the same site. Note that since the up antimatter is delocalized, it technically cannot be at a fine grid site. In order for this catalysis to work, we treat the up antimatter like we suggested in coding the equilibrium calculation—the particles may be thought of as residing on the fine grid cube for purposes of this calculation. Likewise, we will only allow the annihilation of a down matter-antimatter pair if there is no corresponding up antimatter particle at that site.

We will add one more term to the logic in order to simplify the calculation of the rate coefficient. For creation, there must be an up antiparticle but no up particle; for annihilation, there must be an up particle but no up antiparticle. This gives us the equations:

$$C = \bar{a}_{-i} \bar{n}_{-i} \bar{n}_i R_c \tag{14}$$

$$A = a_{-i} \bar{a}_{-i} n_{-i} n_i R_a \tag{15}$$

At equilibrium, $$0 = C - A \tag{16}$$

$$0 = \bar{a}_{-i} a_i \bar{n}_{-i} \bar{n}_i R_c - a_{-i} \bar{a}_i n_{-i} n_i R_a \tag{17}$$

$$\hat{a}_i R_c = \hat{a}_{-i} \bar{n}_{-i} \bar{n}_i R_a \tag{18}$$

where $\hat{i} = r/r$.

If we select $R_a = 1$ (i.e., no mask) and $R_c = \hat{n}_{-i} \hat{m}_i$ then our equilibrium equation will be the desired $a_{-i} = a_i$.

The main benefit of these particular creation and annihilation operators is that the rate constant $R_c$ is only weakly dependent of the particle state i. As a result, we may compute one rate mask which will apply for all states.

It is important to note that the equilibrium calculation for the up antimatter depends upon the system having a large degree or randomness (just as the equilibrium calculation for regular matter does—this randomness is a necessary precondition for the use of Bernoulli trials as above). This can be accomplished by 'mixing' the antimatter in the interface, which preserves the antimatter exactly but still provides some randomness in the system.

Still more randomness can be provided by allowing collisions between the up and the down antimatter, in much the same way as matter particles collide. Once again, this preserves the conserved quantities in the interface, but it also provides a large amount of randomness in the antimatter. One side effect is that we now add 'transverse antimatter' (which is directed parallel to the interface), which can only be created or removed by collisions between antimatter particles. This antimatter is harmless—its only function is to help with collisions, and it need not be created or annihilated in pairs with matter like the up and down antimatter.

The kinetic theory of these systems requires a statistical theory of the antimatter dynamics that was described above. To this end the kinetic theory formalism for the ordinary matter must be augmented with an operator to account for the antimatter dynamics. In addition, there is a separate set of equations describing the antimatter dynamics. Transport theory will be modified accordingly. It will not depend on the lattice scale, to leading order in the Knudsen number (Euler equation dynamics), as will be evident below.

The standard lattice gas algorithm is constructed by attaching a Boolean field, $n_i(r*)$, to each node $r*$ of the lattice. The number of bits per lattice site, b, is equal to the number of different elements in the state vector, indexed by i, where every velocity direction and energy and species allowed has a state vector element. The microscopic velocities are denoted, $c_i$. Updating of the Boolean field in time consists of a propagation step, $$n_i(r*) \rightarrow n_i(r* + c_i) \tag{19}$$

followed by a collision step inducing a rearrangement of the b-bits on each lattice site. The collision step is described by a complicated non-linear operation, $\Delta_i(\{n_j\})$, whose properties will be considered in detail in the next section. It conserves the fundamental invariants of mass, momentum, and energy exactly. These conservation laws are expressed as vanishing moments or state sums over the microscopic mass, momentum, and energy, $$\sum_i m_i \Delta_i(\{n_j\}) = \forall n_i \tag{20}$$

$$\sum_i m_i c_i \Delta_i(\{n_j\}) = 0 \; \forall n_i \tag{21}$$

The energy conservation law is different from mass conservation, when a true energy degree of freedom is present as required to eliminate all the discreteness artifacts and give true hydrodynamics, $$\sum_i \tfrac{1}{2} m_i c_i^2 \Delta_i(\{n_j\}) = 0 \; \forall n_i \tag{22}$$

The complete microdynamical update rule is then written, $$n_i(t*+1, r* + c_i) - n_i = \Delta_i(\{n_j\}) \tag{23}$$

Although the above equations are exact Boolean relations, they maintain the identical form when statistically averaged when one factors the terms in the collision operator. This factorization procedure, the so-called Boltzmann approximation, has even more validity for a lattice gas than it does for a real gas owing to the Shot Noise Theorem. C. Teixeira, K. Molvig, "Shot Noise Theorem for Lattice Gases," PFC Report PRC-JA-91-22, 1991. For simplicity, we here regard the Boolean and statistically averaged equations interchangeably.

An additional operator must be added to the right hand side of equation (23) to account for the matter that can be created or destroyed by the antimatter interaction. We denote this operator by, $\Lambda_i^{M \leftarrow A}$, with the superscript M←A, denoting matter creation. The complete equation for the matter then becomes, $$n_i(t*+1, r* + c_i) - n_i = \Delta_i(\{n_j\}) + \Lambda_i^{M \leftarrow A} \tag{24}$$

Upon expanding the difference operators, we obtain, $$\frac{\partial n_i}{\partial t} + c_i \cdot \nabla n_i = \Delta_i(\{n_j\}) + \Lambda_i^{M \leftarrow A} \tag{25}$$

Note that the grid scale does not appear in the kinetic equation (25) to this order.

The antimatter time development is given simply by, $$\frac{\partial a_i}{\partial t} = \Lambda_i^{M \rightarrow A}, \tag{26}$$

where, $\Lambda_i^{M \to A}$, is the creation rate of antimatter, and no advection term is present since the antimatter does not propagate.

Transport equations can be derived by expanding about local thermal equilibrium, or $\Delta_i(\{n_j\})=0$. This puts the effects of the interface at the transport order, and requires, from the antimatter equation (26), that, $\Lambda_i^{M \to A}=0$ also. Thus the antimatter equilibrium can be decoupled from the matter equilibrium and the whole expansion becomes quite tractable.

The conservation laws now require moments over the matter and antimatter equations together, since only the total system mass, momentum, and energy are conserved, $$\rho = \sum_i m_i(n_i - a_i) \tag{27}$$

$$\rho u = \sum_i m_i c_i(n_i - a_i) \tag{28}$$

$$U_p + \tfrac{1}{2}\rho u^2 = \sum_i \tfrac{1}{2} m_i c_i^2 (n_i - a_i) \tag{29}$$

Thus by adding the matter and antimatter equations together, and taking moments the conservation laws can be obtained.

For the continuity equation, we find, $$\frac{\partial \rho}{\partial t} + \nabla \cdot \rho u^* = 0 \tag{30}$$

where $\rho u^*$ is the matter momentum flux alone. The momentum equation is given, similarly, by, $$\frac{\partial}{\partial t}\rho u + \nabla \cdot S^* = 0 \tag{31}$$

where, $S^* = \Sigma_i m_i c_i c_i n_i$, is again the stress associated with the matter.

Outside of the interface region there is no antimatter so that the momentum equation is simply $$\frac{\partial}{\partial t}\rho u^* + \nabla \cdot S^* = 0 \tag{32}$$

In the interface region, equation (31) applies, which is, when expanded, $$\frac{\partial}{\partial t}\rho u^* + \nabla \cdot S^* + \frac{\partial}{\partial t}\rho u^A = 0 \tag{33}$$

where $$\rho u^A = -\sum_i m_i c_i a_i \tag{34}$$

Thus the only difference between the momentum equations of the interface and the rest of the system is the time dependence of the antimatter momentum. If $\rho u^A = 0$ (presence of equal amounts of up and down antimatter) or equilibrium has been reached then the interface should have no effect on the bulk flow. One physical explanation of this desirable result is that, for example, when $8-x$ up particles reach an interface, x particle/antiparticle paris are added with momentum randomly distributed throughout the interfacial fine grid to make a coarse particle. There is no added shear because there is no preferred direction to the added antimatter particles. The continuity equation is affected by the added antimatter in the same manner.

In summary, both continuity and momentum equations indicate that the interface artifacts are associated with the antimatter momentum. If the interface algorithm can achieve, $\rho u^A = 0$, (no antimatter momentum), at all times, then the transport equations are precisely those of a continuum (Euler) fluid, and the interface is effectively erased from the dynamics.

A method for achieving this is the introduction of "down" antimatter, pointing from the coarse to the fine grid. This direction is not needed to accomplish the transition from coarse to fine grids, since the massive particles can simply be exploded onto the fine grid, but it is suggested by symmetry of the algorithm and is, in fact, precisely what is needed to maintain zero average momentum in the antimatter. This is accomplished, as shown above, by catalyzing the down antimatter reaction using the upward directed antimatter, in such a way as to maintain an equilibrium with zero net antimatter flux.

While this invention has been particularly shown and described with references to preferred embodiments thereof, it will be understood by those skilled in the art that various changes in form and details may be made therein without departing from the spirit and scope of the invention as defined by the appended claims. For example, the collision and move processes may be performed in a common ALU unit. Though parallel processors are preferred, a single programmed computer may serve as both the collision processing means and the move processing means. Certain aspects of the invention do not require processing of state vectors in combinational logic. For example, the particle representations of individual particles may be an accumulation at each site defining total mass, momentum and energy at the site. Those parameters may then by processed together in a flow algorithm. In particular, with fluid flow a Boltzmann's distribution may be applied to the mass, momentum and energy summations with rates of forward and reverse energy exchange determined by temperature. The result is another element representation in the form of mass, momentum and energy summations, or a state vector to facilitate the move operation. Further, the invention has application beyond fluid dynamics. It may be used whenever an interactive process may be modeled as flow of particles or other elements on a lattice.

What is claimed is:

1. A data processor for processing data of a plurality of sites of a lattice to simulate an interactive process across the lattice, the data processor comprising:

storage storing a state vector for each site of the lattice, each state vector including a like set of bits representing elements at the site of the lattice, each element having specific amplitude and specific direction of movement within the lattice;

interaction processing means for processing, for each lattice site, the state vector to generate a second state vector in a time step; and move processing means for processing the state vectors across the lattice to generate with each time step new state vectors which reflect movement of elements in the lattice to new sites;

the interaction processing means comprising logic which applies at least one rule to bits of the state vector to modify the state vector and means for selecting bits of the state vector and applying the bits to the logic such that the logic applies the at least one rule in successive cycles within each time step to different permutations of bits of the state vector as modified within the time step.

2. A data processor as claimed in claim 1 wherein the interaction processing means processes the state vector to cause a second state vector which reflects a transfer of energy between particles, different rates of energy being transferred in one direction then in an inverse direction.

3. A data processor as claimed in claim 1 further comprising a masking input to the logic to prevent performance of a collision rule.

4. A data processor as claimed in claim 1 further comprising local memory which is local to the logic and means for retrieving from storage full state vectors of plural adjacent sites of a volume of the lattice and storing the retrieved state vectors in local memory, and the means for selecting selects like subsets of bits from all state vectors of the volume and applies the bits in parallel to the logic for application of a common rule in parallel to plural sites, different subsets of bits being applied to the logic in sequence to apply to the common rule to different permutations of bits.

5. A data processor as claimed in claim 1 wherein the logic and the means for selecting process the state vector to cause a second state vector which reflects a transfer of energy between moving elements of different four-dimensional velocities of different energy states, different rates of energy being transferred in one direction then in an inverse direction.

6. A system as claimed in claim 1 further comprising a masking input to the interaction processing means to prevent performance of interaction rules.

7. A data processor as claimed in claim 1 wherein the move processing means provides movement of elements on a nonuniform lattice grid, portions of the grid having different unit dimensions.

8. A data processor as claimed in claim 1 wherein the state vector identifies at least 54 elements at each site of the lattice.

9. A data processor as claimed in claim 1 wherein the interaction processing means processes only a subset of bits of each state vector in each cycle.

10. A system as claimed in claim 1 wherein the interaction processing means selects like bits of a plurality of sites of the lattice together and applies a common interaction rule to all selected bits simultaneously in a common processor.

11. A system as claimed in claim 10 further comprising a sequencer for selecting the bits to be processed in an interaction rule from all bits of the plurality of sites to be processed in the common processor.

12. A data processor as claimed in claim 1 wherein the elements are particles and the rule performed by the logic is a collision rule, the logic causing a collision when the state vector indicates that all of selected colliding particles are present and that there are holes where all of selected collided particles are to be present after the collision.

13. A data processor as claimed in claim 12 wherein the collision rule is performed in combinational logic which is specific to the collision rule.

14. A method of processing data of a plurality of sites of a lattice to simulate an interactive process across the lattice, the method comprising:

storing a state vector for each site of the lattice, each state vector including a like set of bits representing elements at the site of the lattice of specific amplitude and specific direction of movement within the lattice;

for each site of the lattice, selecting bits of the state vector and applying the bits to logic, the logic applying at least one rule to bits of the state vector to modify the state vector, the at least one rule being applied in successive cycles within a time step to different permutations of bits of the state vector as modified within the time step; and processing the state vectors across the lattice to generate with each time step new state vectors which reflect movement of elements in the lattice to new sites.

15. A method as claimed in claim 14 wherein the elements represented by the state vector represent particles and the rule applied by the logic is a collision rule, the logic allowing a collision when the state vector indicates that all colliding particles are present and that there are holes where all collided particles are to be present after the collision.

16. A method as claimed in claim 14 wherein the state vector is processed to cause a second state vector which reflects a transfer of energy between particles, different rates of energy being transferred in one direction then in an inverse direction.

17. A method as claimed in claim 14 further comprising a masking input to the logic to prevent application of a collision rule.

18. A method as claimed in claim 14 comprising selecting like bits of a plurality of sites of the lattice together and applying a common rule to all selected bits in a common processor.

19. A method as claimed in claim 14 herein full state vectors of plural adjacent sites of a volume of the lattice are retrieved from memory and stored local to the logic, and like subsets of bits from all state vectors of the volume are applied in parallel to the logic for application of a common rule in parallel to plural sites, different subsets of bits being applied to the logic in sequence to apply the common rule to different permutations of bits.

20. A method as claimed in claim 14 wherein the new state vector reflects a transfer of energy between moving elements of different four-dimensional velocities of different energy states, different rates of energy being transferred in one direction than in an inverse direction.

21. A method as claimed in claim 14 wherein the state vectors are processed to provide movement of elements on a nonuniform lattice grid, portions of the grid having different unit dimensions.

22. A method as claimed in claim 14 wherein the state vector identifies at least 54 elements at each site of the lattice.

23. A method as claimed in claim 14 wherein only a subset of bits of each state vector is selected in each cycle.

24. A flow processing system comprising:

storage storing particle representations of plural particles for each of plural sites of a lattice, the lattice comprising a first grid of a first unit dimension spanning a first volume and a second grid of a second unit dimension spanning a second volume;

collision processing means for processing, for each lattice site, particle representations to generate second particle representations according to collision rules;

move processing means for processing the representations across the lattice to generate new representations which reflect movement of particles in the lattice to new sites; and grid interface processing means for coalescing particles of the first grid into larger particles of the second grid and for exploding particles of the second grid into multiple smaller particles in the first grid.

25. A flow processing system as claimed in claim 24 wherein the collision processing means processes particle representations of the respective grids at rates which are inversely related to the unit dimensions of the grids.

26. A flow processing system as claimed in claim 25 wherein the first and second grids overlap in a volume in which the particles coalesce and explode.

27. A flow processing system as claimed in claim 26 further comprising means for coalescing particles of the first grid into a particle of the second grid having a larger mass than the total mass of the coalesced particles and for subsequently eliminating particles of the first grid without coalescing them into particles of the second grid in order to maintain a conservation of mass at the grid interface over time.

28. A flow processing system as claimed in claim 27 further comprising means for storing a count for a block of sites in the first grid which represents an imbalance in the mass of particles coalesced from the first grid into particles of the second grid.

29. A flow processing system as claimed in claim 27 further comprising means for creating particles in the first grid other than by explosion of particles from the second grid and subsequently annihilating particles in the first grid to maintain conservation of mass at the interface over time.

30. A flow processing system as claimed in claim 29 wherein the particles in the first grid are created and annihilated as a function of the presence of other particles at the interface moving from the first grid toward the second grid.

31. A flow processing system as claimed in claim 26 wherein the particle representations identify, for each particle, one of plural possible particle speeds.

32. A flow processing system as claimed in claim 31 wherein the particle representations comprise sets of bits for each lattice site, each bit of a set of bits representing a particle of particular energy and a particular direction of movement at the site.

33. A flow processing system as claimed in claim 31 wherein the first and second grids overlap by different amounts for particles of different speeds.

34. A flow processing system as claimed in claim 31 wherein the collisions processing means processes a reduced set of collision rules at the grid interface to prevent transfers of energy between particles which increase the speed of particles.

35. A method of flow processing in a data processor comprising:

storing particle representations of plural particles for each of plural sites of a lattice, the lattice comprising a first grid of a first unit dimension spanning a first volume and a second grid of a second unit dimension spanning a second volume;

processing, for each lattice site, particle representations to generate second particle representations according to collision rules;

processing the representations across the lattice to generate new representations which reflect movement of particles in the lattice to new sites; and coalescing particles of the first grid into larger particles of the second grid and exploding particles of the second grid into multiple smaller particles in the first grid.

36. A method as recited in claim 35 further comprising processing particle representations of the respective grids at rates which are inversely related to the unit dimensions of the grids.

37. A method as claimed in claim 36 wherein the first and second grids overlap in a volume in which the particles coalesce and explode.

38. A method as claimed in claim 37 wherein particles of the first grid are coalesced into a particle of the second grid having a larger mass than the total mass of the coalesced particles and wherein particles of the first grid are eliminated without coalescing them into particles of the second grid in order to maintain a conservation of mass at the grid interface over time.

39. A method as claimed in claim 38 further comprising storing a count for a block of sites in the first grid which represents an imbalance in the mass of particles coalesced from the first grid into particles of the second grid.

40. A method as claimed in claim 38 further comprising creating particles in the first grid other than by explosion of particles from the second grid and subsequently annihilating particles in the first grid to maintain conservation of mass at the interface over time.

41. A method as claimed in claim 40 wherein the particles in the first grid are created and annihilated as a function of the presence of other particles at the interface moving from the first grid toward the second grid.

42. A method as claimed in claim 37 wherein the particle representations identify, for each particle, one of plural possible particle speeds.

43. A method as claimed in claim 42 wherein the particle representations comprise sets of bits for each lattice site, each bit of a set of bits representing a particle of particular energy and a particular direction of movement at the site.

44. A method as claimed in claim 42 wherein the first and second grids overlap by different amounts for particles of different speeds.

45. A method as claimed in claim 42 wherein a reduced set of collision rules are processed at the grid interface to prevent transfers of energy between particles which increase the speed of particles.

46. A data processor for processing data of a plurality of sites of a lattice to simulate an interactive process across the lattice, the data processor comprising:

storage storing a state vector for each site of the lattice, each state vector including a like set of bits representing elements at the site of the lattice, each element having specific amplitude and specific direction of movement within the lattice;

interaction processing means for processing, for each lattice site, the state vector to generate a second state vector in a time step, the interaction processing means selecting, in each of successive cycles within a time step, like subsets of bits of the state vectors of a plurality of sites of the lattice together and applying a common interaction rule to all selected bits in a common processor; and move processing means for processing the state vectors across the lattice to generate with each time step new state vectors which reflect movement of elements in the lattice to new sites.

47. A data processor as claimed in claim 46 further comprising a sequencer for selecting the subset of bits to which an interaction rule is applied from all bits of the plurality of sites to be processed in the common processor.

48. A method of processing data of a plurality of sites of a lattice to simulate an interactive process across the lattice, the method comprising;

storing a state vector for each site of the lattice, each state vector including a like set of bits representing elements at the site of the lattice of specific amplitude and specific direction of movement within the lattice;

for each site of the lattice selecting, in each of successive cycles within a time step, like subsets of bits of the state vectors of a plurality of sites of the lattice together and applying a common interaction rule to all selected bits in a common processor;

processing the state vectors across the lattice to generate with each time step new state vectors which reflect movement of elements in the lattice to new sites.

49. A method as claimed in claim 48 wherein the subset of bits is selected by a sequencer from all bits of the plurality of sites to be processed in the common processor.

50. A data processor for processing data of a plurality of sites of a lattice to simulate an interactive process across the lattice, the data processor comprising:

storage storing state vectors of plural elements, including moving elements of at least three possible energy states, for each of plural sites of a lattice, the sum over the directions of the four-fold tensor product of unit vectors in each energy state forming a purely isotropic rank four tensor in each energy state;

interaction processing means for processing, for each lattice site, the state vectors to generate a second state vector which reflects a transfer of energy between elements of different energy states; and move processing means for processing the state vectors across the lattice to generate new state vectors which reflect movement of elements in the lattice to new sites.

51. A method of processing data of a plurality of sites of a lattice to simulate an interactive process across the lattice, the method comprising:

storing state vectors of plural elements, including moving elements of at least three possible energy states, for each of plural sites of a lattice, the sum over the directions of the four fold tensor product of unit vectors in each energy state forming a purely isotropic rank four tensor in each energy state;

for each lattice site, processing the state vector to generate a second state vector which reflects a transfer of energy between elements of different energy states;

processing the state vectors across the lattice to generate new state vectors which reflect movement of elements in the lattice to new sites.

52. A data processor for processing data of a plurality of sites of a lattice to simulate an interactive process across the lattice, the data processor comprising:

storage storing a state vector for each site of the lattice, each state vector including a like set of bits representing at least fifty-four particles at the site of the lattice, each particle having specific amplitude and specific direction of movement within a four dimensional lattice;

collision processing means for processing, for each lattice site, the state vector to generate a second state vector in a time step, the collision processing means comprising a sequencer for selecting like bits of a plurality of sites of the lattice together and combinational logic for applying a common collision rule on all selected bits to modify this state vector, the combinational logic applying the collision rule by causing a collision when the state vector indicates that all of selected colliding particles are present and that there are holes where all of selected collided particles are to be present after the collision, the combinational logic causing a second state vector which reflects a transfer of energy between moving elements of different four dimensional velocities and different energy states, different rates of energy being transferred in one direction than in an inverse direction, and the combinational logic applying the collision rule in successive cycles within each time step to different permutations of bits of the modified state vector; and move processing means for processing the state vectors across the lattice to generate with each time step new state vectors which reflect movement of elements in the lattice to new sites.

53. A data processor as claimed in claim 52 wherein the move processing means provides movement of elements on a nonuniform lattice grid, portions of the grid having different unit dimensions.

54. A method of processing data of a plurality of sites of a lattice to simulate an interactive process across the lattice, the method comprising;

storing a state vector for each site of the lattice, each state vector including a like set of bits representing at least fifty-four particles at the site of the lattice, each particle having specific amplitude and specific direction of movement within a four-dimensional lattice;

processing, for each lattice site, the state vector to generate a second state vector in a time step, the processing including selecting by means of a sequencer like bits of a plurality of sites of the lattice together and applying a common collision rule to all selected bits, the collision rule causing a collision when the state vector indicates that all selected colliding particles are present and that there are holes where all selected collided particles are to be present after the collision, the processing causing a second state vector which reflects a transfer of energy between moving elements of different four-dimensional velocities in different energy states, different rates of energy being transferred in one direction than in an inverse direction, the collision rule being applied in successive cycles within each time step to different permutations of bits of the modified state vector;

processing the state vectors across the lattice to generate with each time step new state vectors which reflect movement of elements in the lattice to new sites.

55. A method as claimed in claim 54 wherein the state vectors are processed across the lattice to provide movement of elements on a nonuniform lattice grid, portions of the grid having different unit dimensions.

* * * * *

UNITED STATES PATENT AND TRADEMARK OFFICE
CERTIFICATE OF CORRECTION

PATENT NO. : 5,377,129

DATED : December 27, 1994

INVENTOR(S) : Kim Molvig and Gregory M. Papadopoulos

It is certified that error appears in the above-identified patent and that said Letters Patent is hereby corrected as shown below:

Cover page, Section [63], insert at the beginning: --Continuation-in-part of PCT Application No. PCT/US91/04930, July 12, 1991, designating the United States, which is a--.

Cover page, Section for Attorney, Agent, or Firm, "Fish & Richardson" should be --Hamilton, Brook, Smith & Reynolds, P.C.--.

Cover page 2, second column, in the "D. d'Humieres et al. reference, "lattice" should be --Lattice--.

Cover page 2, second column, in the B. Chopard and M. Droz reference, "Head" should be --Heat--.

Column 5, line 11, "+1" should be --$\pm 1$--.

Signed and Sealed this

Thirty-first Day of October 1995

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,377,129

DATED : December 27, 1994

INVENTOR(S) : Kim Molvig and Gregory M. Papadopoulos

It is certified that error appears in the above-identified patent and that said Letters Patent is hereby corrected as shown below:

Column 10, line 35, "non-Gallilean" should be --non-Galilean--.

Column 10, line 53, "Non-Gallilean" should be --Non-Galilean--.

Column 11, line 16, "Gallilean" should be --Galilean--.

Column 11, line 17, "non-Gallilean" should be --non-Galilean--.

Column 11, lines 25 and 27, "Gallilean" should be --Galilean--.

Column 13, line 39, equation (4), insert a line over the first "B".

Column 14, line 62, after "$10^8$", insert a space.

Column 23, line 56, "paris" should be --pairs--.

Column 25, line 24, "ŕ" should be --$\hat{r}$--.

Column 27, line 65, "paris" should be --pairs--.

Column 28, line 37, "by" should be --be--.

Column 30, line 36, "herein" should be --wherein--.